(12) United States Patent
Yu et al.

(10) Patent No.: US 11,470,787 B2
(45) Date of Patent: Oct. 18, 2022

(54) SALT-ISOLATED RAIN GARDEN STRUCTURE

(71) Applicants: Shanghai Municipal Engineering Design Institute (Group) Co., Ltd., Shanghai (CN); Shanghai Jiao Tong University, Shanghai (CN)

(72) Inventors: Bingqin Yu, Shanghai (CN); Shengquan Che, Shanghai (CN); Lu Wang, Shanghai (CN); Zulan Mo, Shanghai (CN); Yongpeng Lv, Shanghai (CN); Yan Chen, Shanghai (CN); Chen Zhang, Shanghai (CN)

(73) Assignees: Shanghai Municipal Engineering Design Institute (Group) Co., Ltd., Shanghai (CN); Shanghai Jiao Tong University, Shanghai (CN)

( * ) Notice: Subject to any disclaimer, the term of this patent is extended or adjusted under 35 U.S.C. 154(b) by 157 days.

(21) Appl. No.: 16/889,022

(22) Filed: Jun. 1, 2020

(65) Prior Publication Data

US 2021/0029900 A1 Feb. 4, 2021

(30) Foreign Application Priority Data

Jul. 30, 2019 (CN) .......................... 201910694538.X

(51) Int. Cl.
*A01G 25/00* (2006.01)
*A01G 24/42* (2018.01)
*A01G 24/13* (2018.01)

(52) U.S. Cl.
CPC ............. *A01G 24/42* (2018.02); *A01G 24/13* (2018.02)

(58) Field of Classification Search
CPC ................................ A01G 24/42; A01G 24/13
See application file for complete search history.

(56) References Cited

FOREIGN PATENT DOCUMENTS

| CN | 206232572 U | * | 6/2017 | ............. Y02A 30/60 |
| CN | 107386415 A | * | 11/2017 | ............. E01C 11/223 |
| KR | 20110004681 A | * | 1/2011 | ............. E04D 11/002 |
| WO | WO 2007091944 A1 | * | 8/2007 | ............. A01G 24/23 |

* cited by examiner

*Primary Examiner* — Kathleen I Alker
(74) *Attorney, Agent, or Firm* — Troutman Pepper Hamilton Sanders LLP; Christopher C. Close, Jr.

(57) ABSTRACT

The present invention belongs to the technical field of landscape garden engineering, and specifically discloses a salt-isolated rain garden structure. The salt-isolated rain garden structure includes a depression surrounded by side slopes, where a 10 cm thick drainage layer, a 10-30 cm thick filler layer, a 5 cm thick transition layer, a 20-30 cm thick planting layer, a 0.2-0.5 cm thick mulch layer and a 15-20 cm thick ponding layer are stacked in order from the bottom of the depression to up; a salt barrier is disposed between the planting layer and the transition layer and/or between the drainage layer and a saline layer; a vertical overflow pipe and a horizontal drainage pipe are disposed at the bottom of the depression; the overflow pipe and drainage pipe are connected; the salt barrier is filled with river sand, zeolite or ceramsite and is 10-20 cm in thickness.

6 Claims, 6 Drawing Sheets

SALT-ISOLATED RAIN GARDEN STRUCTURE

TECHNICAL FIELD

The present invention belongs to the technical field of landscape garden engineering, and specifically discloses a salt-isolated rain garden structure.

BACKGROUND

Sponge cities refer to cities like a sponge with good "elasticity" to adapt to environmental changes and respond to natural disasters caused by rain, etc. Sponge city construction (SCC) is an important way to realize urban stormwater and flood management, and one of the important media to realize the construction of ecological city. Sponge cities make more reasonable use of stormwater. Water-absorbing materials are used to lay the city, and plant ponds in the residential quarters and on the sidewalks are constructed like sponges, which serve as ornamental landscapes at ordinary times and hold water in case of heavy rain. The sponge structures in the city can absorb a lot of stormwater, so as to avoid large-scale water accumulation, and avoid flood disasters caused by stormwater collection in the city. The stormwater absorbed through the urban sponges can be reused to protect water resources and make full use of them.

SCC can bring considerable economic benefits. In the conventional city construction, due to the need to build a large number of drainage pipes and reinforced concrete reservoirs, the city construction cost is very high. SCC fully protects the natural water system, makes more reasonable use of water resources, greatly reduces the amount of urban construction projects, saves urban construction costs, and promotes urban beautification. In terms of environmental protection, sponge cities play a role in water purification, thereby reducing treatment costs and reducing losses caused by natural disasters.

The core of SCC is low-impact development (LID). Specifically, it is to reduce damage to the ecological environment of the development site, maintain the hydrological regime before and after development, reduce surface water pollution and purify water resources to reduce urban pressure. In this way, a complete stormwater management system is formed to improve the stormwater management capability and reduce water pollution. SCC attaches importance to ecological civilization and meets the requirements of urban development. SCC promotes the use of LID approaches, such as rain gardens, which are used to effectively hold stormwater in the early days of storms, reduce road water accumulation and stormwater backfilling in the underlying buildings. SCC also reduces water pollution and prevents eutrophication of water bodies. Therefore, it can improve the living environment in coastal areas. To promote SCC in coastal areas, it is necessary to study LID construction techniques suitable for coastal areas based on the local climate and stormwater and flood management capabilities.

With the continuous growth of the global population, many countries have developed coastal land to resolve the contradiction between population and resources and environment. China's coastal areas have the advantages of being open to the outside world, and have formed many large and medium-sized cities with rapid economic development and high urbanization. However, these cities have limited geographical conditions, and have long faced problems such as clay soil, low desalination, salinization of the soil, high and changeful groundwater level, and single vegetation types. In addition, for most coastal areas, as the rainy season is concentrated between July and August when the rainfall accounts for about 90% of the whole year, there are rain and flood disasters. The uneven rainfall distribution increases the burden on the urban drainage system during the rainy season. It causes serious runoff pollution, and causes a large amount of heavy metal ions to enter the soil, further destroying the soil structure, leading to more serious salinization and secondary salinization of the soil and forming a vicious cycle.

SUMMARY

An objective of the present invention is to provide a salt-isolated rain garden structure to solve the problem of salinization and secondary salinization of soil in the coastal tidal flat.

In order to achieve the above objective, the present invention adopts the following technical solution: A salt-isolated rain garden structure, including a depression surrounded by side slopes, where a 10 cm thick drainage layer, a 10-30 cm thick filler layer, a 5 cm thick transition layer, a 20-30 cm thick planting layer, a 0.2-0.5 cm thick mulch layer and a 15-20 cm thick ponding layer are stacked in order from the bottom of the depression to up; a salt barrier is disposed between the planting layer and the transition layer and/or between the drainage layer and a saline layer; a vertical overflow pipe and a horizontal drainage pipe are disposed at the bottom of the depression; the overflow pipe and drainage pipe are connected; the salt barrier is filled with river sand, zeolite or ceramsite and is 10-20 cm in thickness.

Further, the particle size of the river sand is 0.25-0.35 mm; the particle size of the zeolite is 2-4 mm; and the particle size of the ceramsite is 10-25 mm.

Further, the drainage layer is 0.10 m in thickness and filled with gravel with a diameter of 10-20 mm.

Further, the transition layer is filled with medium sand with a particle size of 0.35-0.50 mm.

Further, the filler layer is planting soil including a mixture of 30% of common greening topsoil, 50% of sandy soil and 20% of peat soil (by volume).

Further, the mulch layer is bark or gravel, and the transition layer is a permeable geotextile or medium sand.

This technical solution has the following working principles and beneficial effects:

(1) In the present invention, the rain garden structure with a salt barrier has a better salt isolation effect than the ordinary rain garden structure. The salt-isolated rain garden controls the salt content of the planting soil below 0.2%, which meets the growth needs of various salt-tolerant plants. The present invention forms a parameter system of the salt-isolated rain garden structure suitable for coastal saline areas by studying the salt isolation, hydrological storage and water purification effects of the salt-isolated rain garden structure through simulation experiments.

(2) The present invention further constructs a salt-isolated rain garden suitable for a sponge city pilot area according to the functional requirements of different sites, solving the problems of difficult construction of rain garden, weak environmental function and poor landscape in the pilot area.

(3) The present invention carries out a systematic study of the rain garden for coastal areas, and provides reference for the future adaptability study of sponge facilities in coastal saline areas.

(4) The present invention provides theoretical support and technical guidance for SCC, promotes the implementation of sponge city demonstration projects, and has obvious practical application value.

(5) The salt-isolated rain garden structure proposed by the present invention provides reference for SCC in both coastal areas and mega cities.

DETAILED DESCRIPTION

Figure 1:
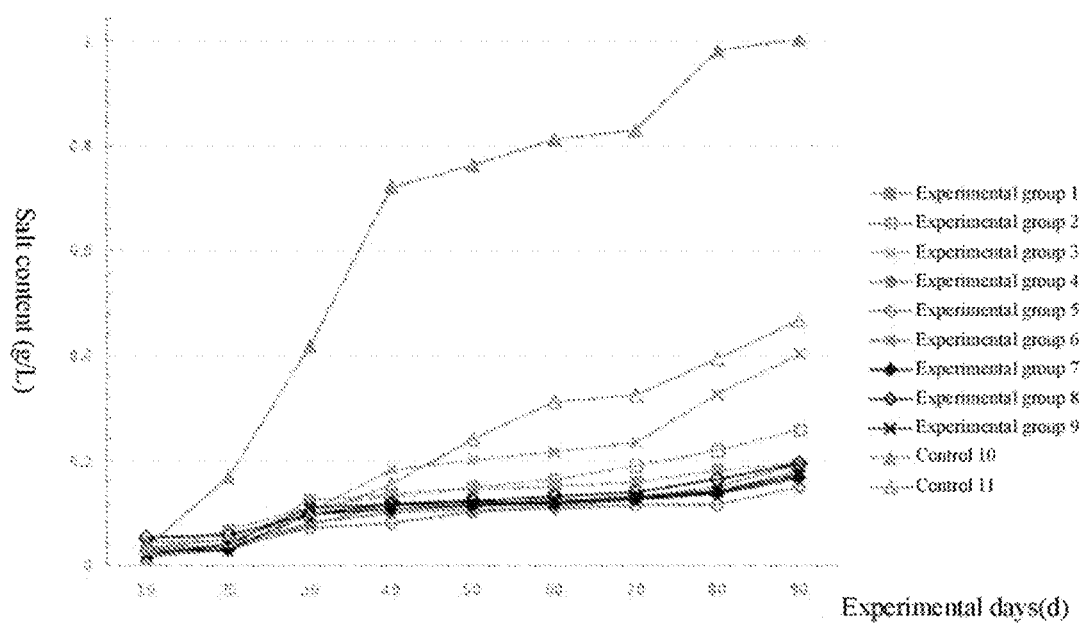
FIG. 1 is a diagram showing a change in a salt content of a planting layer of a device group in different experimental periods under a resalinization condition according to an example of the present invention.

The present invention is described in more detail below with reference to the specific implementations.

Reference Numerals in the figures are as follows: 1. ponding layer; 2. mulch layer; 3. planting layer; 4. salt barrier; 5. transition layer; 6. filler layer; 7. drainage layer; 8. plain soil compacted layer; 9. overflow port; 10. drainage hole; 11. overflow pipe; 12. stormwater pipe; 13. impervious salt isolation plate; 14. gravel slope; 15. water inlet; 16. rainfall simulator; 17. adjustable rack; 18. seepage pipe; 19. saline layer; 20. second seepage pipe; 21. water collection tank; 22. base; 23. water pump; 24. flow meter; and 25. water supply tank.

Figure 3:
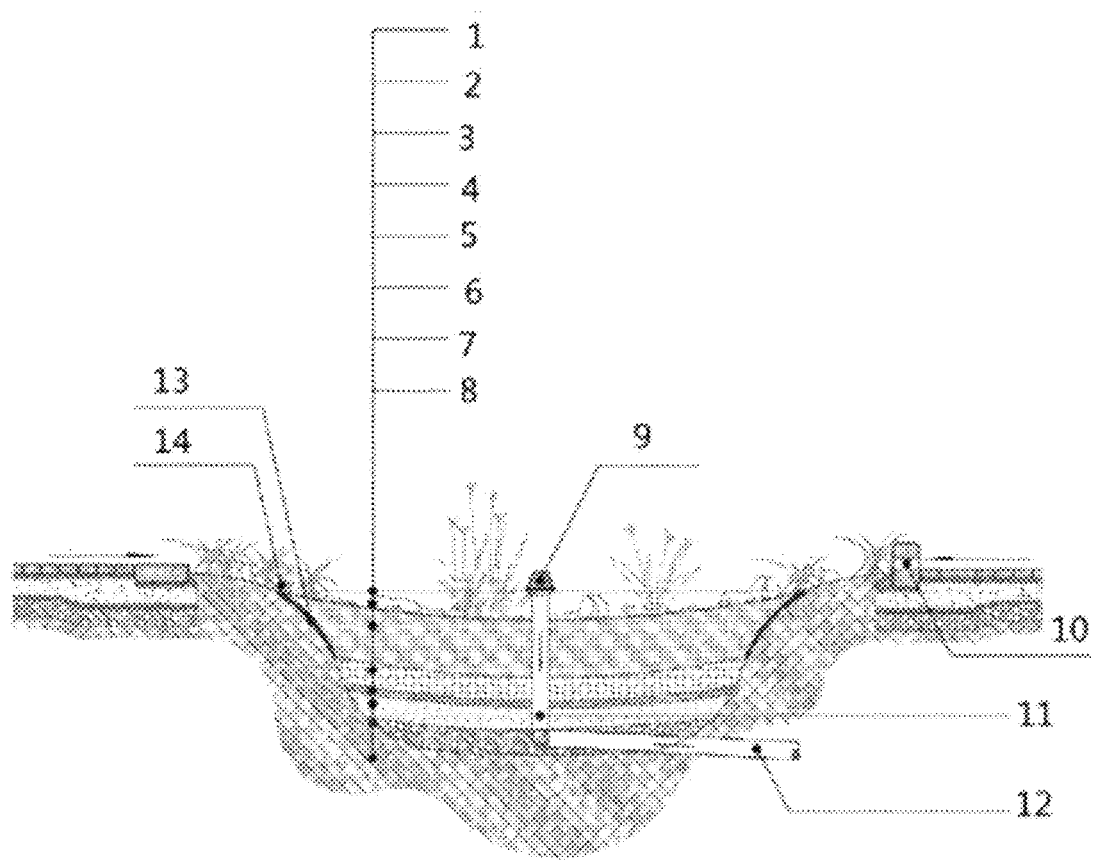
FIG. 3 is a sectional view of a salt-isolated rain garden according to an example of the present invention.

As shown in FIG. 3, a salt-isolated rain garden structure, including a depression surrounded by side slopes, where a 10 cm thick drainage layer, a 10-30 cm thick filler layer, a 5 cm thick transition layer, a 20-30 cm thick planting layer, a 0.2-0.5 cm thick mulch layer and a 15-20 cm thick ponding layer are stacked in order from the bottom of the depression to up; a salt barrier is disposed between the planting layer and the transition layer and/or between the drainage layer and a saline layer; a vertical overflow pipe and a horizontal drainage pipe are disposed at the bottom of the depression; the overflow pipe and drainage pipe are connected; the salt barrier is filled with river sand, zeolite or ceramsite and is 10-20 cm in thickness. The drainage layer is filled with gravel with a diameter of 10-20 mm. The particle size of the river sand is 0.25-0.35 mm; the particle size of the zeolite is 2-4 mm; and the particle size of the ceramsite is 10-25 mm. The transition layer is filled with medium sand with a particle size of 0.35-0.50 mm. In this example, the filler layer is planting soil including a mixture of 30% of common greening topsoil, 50% of sandy soil and 20% of peat soil (by volume). The mulch layer is bark or gravel, and the transition layer is a permeable geotextile or medium sand.

In this example, the salt-isolated rain garden structure was simulated by an experimental device to obtain the optimal performance parameters thereof.

Figure 2:
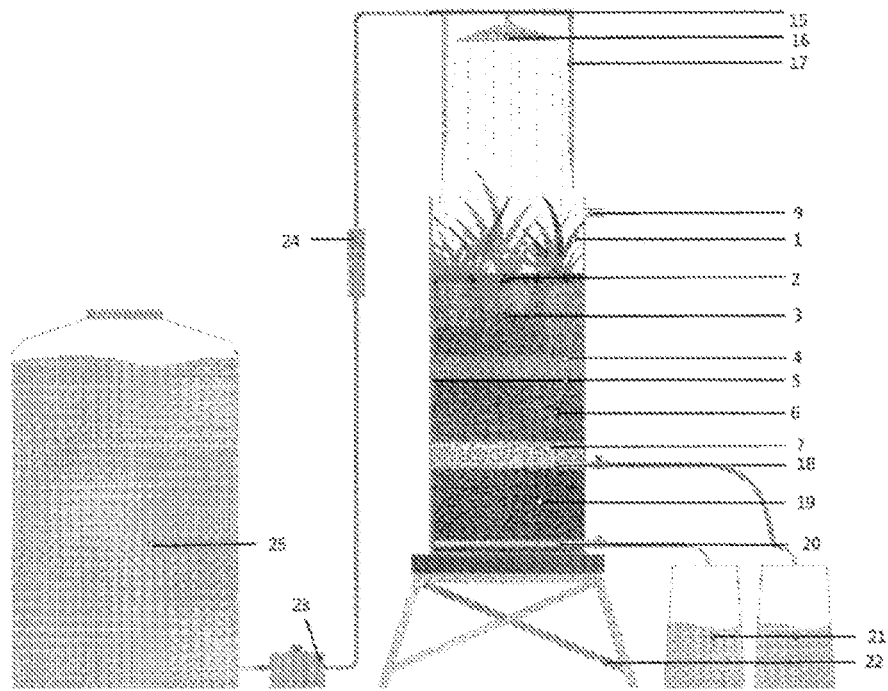
FIG. 2 shows a resalinization and rainfall simulation device for a rain garden according to an example of the present invention.

(1) Scheme design of orthogonal and simulation experiments. Literature reviews and current situation surveys were carried out to derive the currently widely used structural parameters of rain gardens and measures of greening and salt isolation in coastal saline areas. The orthogonal experimental factors and levels were determined, including the materials of the salt barrier (river sand, zeolite and ceramsite), the locations of the salt barrier (between the planting layer and the transition layer, between the filler layer and the drainage layer and between the drainage layer and the saline layer) and the thickness of the filler layer (10 cm, 20 cm and 30 cm). A resalinization and rainfall simulation device of the rain garden (FIG. 2) was built based on an actual salt-isolated rain garden structure (FIG. 3). The simulation device includes a ponding layer 1, a mulch layer 2, a planting layer 3, a salt barrier 4, a transition layer 5, a filler layer 6, a drainage layer 7, a plain soil compacted layer 8, an overflow port 9, a drainage hole 10, an overflow pipe 11, a stormwater pipe 12, an impervious salt isolation plate 13, a gravel slope 14, a water inlet 15, a rainfall simulator 16, an adjustable rack 17, a seepage pipe 18, a saline layer 19, a second seepage pipe 20, a water collection tank 21, a base 22, a water pump 23, a flow meter 24 and a water supply tank 25.

(2) Resalinization suppression effect of salt-isolated rain garden in saline soil. A simulation experiment was carried out by a simulation device to study changes in the salt content of the planting soil layer of different salt-isolated rain garden structures. The main factors affecting the salt isolation effect and the differences at different levels were analyzed based on the experimental data (significance and difference analysis).

The effects of structural parameter variables on the salt isolation effect were derived by experiments, as follows:

The changes in the salt content of the planting layer of 11 experimental device groups during a 90-day resalinization process are shown in FIG. 1, which indicates that the soil salt content of the control groups and experimental groups increases. The salt content of the planting layer in experimental groups 1-9<that of salt barrier-free control group 11<that of control group 10 without salt barrier and rain garden structure. The average salt content of the planting layer of experimental groups 1-9 is 47.2% and 80.9% lower than those of control groups 11 and 10, respectively. This intuitively shows that the rain garden structure with salt barrier and the ordinary rain garden structure both have better salt isolation effect, but the salt isolation effect of the rain garden structure with salt barrier is gradually superior to that of the ordinary rain garden structure over time.

An independent samples t-test was carried out to quantitatively analyze the experiments over different periods (Table 1) The results show that: Compared with control group 10, the difference of the experimental groups in the first 10 d is not obvious (significance>0.05); the salt content of the planting layer decreases significantly (significance≤0.05) after the $20^{th}$ d; the difference on the $80^{th}$ d is the largest, which is 0.806 g/l. The average salt content of the experimental groups is 0.211 g/l (0.13%), indicating that the soil is low-salinity soil. The salt content of control group 10 is 1.010 g/l (0.61%), indicating that the soil is high-salinity soil. The salt water in the deep soil will migrate upward along the pores of the soil capillary in case of strong evaporation. However, the salt barrier set below the planting soil destroys the continuity of the soil capillary, and causes the salt water to stagnate when it reaches the lower interface of the salt barrier, resulting in a decrease in the salt accumulated in the soil above the salt barrier.

As shown in Table 2, compared with control group 11, the difference of experimental groups 1-9 in the first 40 d is not significant (significance>0.05); the salt content of the planting layer decreases significantly (significance≤0.05) after the $50^{th}$ d; the difference on the $90^{th}$ d is the largest, which is 0.285 g/l. The salt content of control group 11 is 0.496 g/l (0.30%), indicating that the soil is medium-salinity soil. Compared with the low-salinity soil in the experimental groups, the resalinization phenomenon in the device groups with only the rain garden structure is more significant. The rain garden structure layers destroy the soil capillary structure and reduces the salt accumulated to some extent. However, the materials like gravel have large particle size, and the mutual infiltration between the structural layers easily occurs over time, thereby gradually forming a water migration path. In addition, these materials do not have internal structures such as lattice required by salt isolation materials, and thus have little adsorption effect on salt ions, resulting in the poor salt isolation effect. The particle size of the salt isolation material is larger than that of the soil, but smaller than that of the gravel. The superposition of the salt isolation material and the gravel at different locations causes a sudden change in the porosity of the saline soil capillary from smaller to larger and then a decrease. The complicated changes effectively weaken the capillary force. Therefore, under the action of a long time, the rain garden with salt barrier reduces the soil salt content and improves the plant growth environment on saline land.

TABLE 1

T-test results showing the relationship between the salt barrier/rain garden structure and the salt content in the planting soil

| Experiment No. | Device No. | N | Mean (g/L) | Mean Difference | Standard Deviation | T | Significance (two-tailed) |
| --- | --- | --- | --- | --- | --- | --- | --- |
| 1 | 1-9 | 27 | 0.029 | 0.005 | 0.013 | −0.618 | 0.542 |
|   | 10  | 3  | 0.034 |       | 0.007 |        |       |
| 2 | 1-9 | 27 | 0.041 | 0.126 | 0.014 | −15.828 | 0.000 |
|   | 10  | 3  | 0.167 |       | 0.005 |        |       |
| 3 | 1-9 | 27 | 0.096 | 0.321 | 0.018 | −28.584 | 0.000 |
|   | 10  | 3  | 0.417 |       | 0.025 |        |       |
| 4 | 1-9 | 27 | 0.120 | 0.599 | 0.028 | −34.685 | 0.000 |
|   | 10  | 3  | 0.719 |       | 0.032 |        |       |
| 5 | 1-9 | 27 | 0.130 | 0.631 | 0.031 | −32.261 | 0.000 |
|   | 10  | 3  | 0.761 |       | 0.019 |        |       |
| 6 | 1-9 | 27 | 0.138 | 0.673 | 0.035 | −28.568 | 0.000 |
|   | 10  | 3  | 0.811 |       | 0.027 |        |       |
| 7 | 1-9 | 27 | 0.149 | 0.679 | 0.040 | −21.287 | 0.000 |
|   | 10  | 3  | 0.828 |       | 0.028 |        |       |
| 8 | 1-9 | 27 | 0.174 | 0.806 | 0.064 |        |       |
|   | 10  | 3  | 0.981 |       | 0.039 | −21.287 | 0.000 |
| 9 | 1-9 | 27 | 0.211 | 0.791 | 0.077 | −17.474 | 0.000 |
|   | 10  | 3  | 1.010 |       | 0.015 |        |       |

Note:
Significance ≤ 0.05 indicates that the factor has a significant effect on the result, significance ≤ 0.01 indicates that the effect of the factor is extremely significant. (Same below)

TABLE 2

T-test results showing the relationship between the salt barrier and the salt content in the planting soil

| Experiment No. | Device No. | N | Mean (g/L) | Mean Difference | Standard Deviation | T | Significance (two-tailed) |
| --- | --- | --- | --- | --- | --- | --- | --- |
| 1 | 1-9 | 27 | 0.029 | 0.003  | 0.013 | −0.361 | 0.721 |
|   | 11  | 3  | 0.032 |        | 0.003 |        |       |
| 2 | 1-9 | 27 | 0.041 | 0.008  | 0.014 | −0.953 | 0.349 |
|   | 11  | 3  | 0.049 |        | 0.006 |        |       |
| 3 | 1-9 | 27 | 0.096 | −0.004 | 0.018 | 0.381  | 0.706 |
|   | 11  | 3  | 0.092 |        | 0.006 |        |       |
| 4 | 1-9 | 27 | 0.120 | 0.033  | 0.028 | −1.992 | 0.056 |
|   | 11  | 3  | 0.153 |        | 0.019 |        |       |
| 5 | 1-9 | 27 | 0.130 | 0.110  | 0.031 | −5.984 | 0.000 |
|   | 11  | 3  | 0.240 |        | 0.007 |        |       |
| 6 | 1-9 | 27 | 0.138 | 0.173  | 0.035 | −8.403 | 0.000 |
|   | 11  | 3  | 0.311 |        | 0.017 |        |       |
| 7 | 1-9 | 27 | 0.149 | 0.175  | 0.040 | −7.390 | 0.000 |
|   | 11  | 3  | 0.323 |        | 0.022 |        |       |
| 8 | 1-9 | 27 | 0.174 | 0.219  | 0.064 |        |       |
|   | 11  | 3  | 0.393 |        | 0.032 | −5.807 | 0.000 |
| 9 | 1-9 | 27 | 0.211 | 0.285  | 0.077 | −5.522 | 0.000 |
|   | 11  | 3  | 0.496 |        | 0.061 |        |       |

The significant effects of various factors on the salt isolation effect were derived by experiments, as follows:

An orthogonal experiment was carried out to determine the salt content of the planting soil layer in different experimental groups, and the statistical package for social sciences (SPSS) was used to carry out a variance test on the effects of various factors on the salt content in the planting soil layer of the rain garden. The results show that the material of the salt barrier and the thickness of the filler layer had a significant effect on the salt content of the planting soil layer (significance≤0.05), and the effect of the location of the salt barrier was insignificant (significance>0.05). The comparison of the variances shows that the effects of the three factors on the salt isolation effect are ranked as follows: the material of the salt barrier>the thickness of the filler layer>the location of the salt barrier (Table 3). Therefore, to play the salt isolation function of the rain garden on a high-salinity site, it is recommended to first select the material of the salt barrier, then design the thickness of the filler layer and finally take into account the location of the salt barrier.

TABLE 3

Variance analysis on the salt isolation effect of various factors

| Source | Type III sum of squares | DF | Mean square | F. stat | Significance |
|---|---|---|---|---|---|
| Corrected model | .105a | 6 | 0.017 | 7.655 | 0 |
| Intercept | 1.208 | 1 | 1.208 | 529.002 | 0 |
| Material of salt barrier | 0.071 | 2 | 0.036 | 15.617 | 0 |
| Thickness of filler layer | 0.022 | 2 | 0.011 | 4.876 | 0.019 |
| Location of salt barrier | 0.011 | 2 | 0.006 | 2.472 | 0.11 |
| Error | 0.046 | 20 | 0.002 | — | — |
| Total | 1.359 | 27 | — | — | — |
| Total after correction | 0.151 | 26 | — | — | — |

Note:
R-squared = .697 (adjusted R-squared = .606).

The differences in the salt isolation effect at various levels were derived by experiments, as follows:

An honest significant difference (HSD) test was carried out to compare the differences in the salt isolation capabilities of the materials of the salt barrier, such as river sand, zeolite and ceramsite. The results show that among the materials of the salt barrier (factor A), the zeolite had the lowest salt content in the planting soil, 0.173 g/l (0.10%); the ceramsite had the higher salt content, 0.177 g/l (0.11%); the river sand had the highest salt content, 0.284 g/l (0.17%) (Table 4). There are a large number of pore channels in the internal lattice structure of the zeolite, which can absorb $Na^+$, $Cl^-$ and other salt ions with diameters smaller than the pore channels. In addition, the zeolite and ceramsite have larger particle size, and are more capable than the river sand to block the ascending phreatic water and infiltrate the descending gravity water. Therefore, the zeolite has the best salt isolation effect when it is used as the salt barrier of the rain garden.

TABLE 4

Salt content of planting soil layer at different levels of factor A

| Material of salt barrier | Total samples | Subset 1 | Subset 2 |
|---|---|---|---|
| Zeolite | 9 | 0.173333 | — |
| Ceramsite | 9 | 0.177111 | — |
| River sand | 9 | — | 0.284222 |
| Significance | — | 0.985 | 1 |

Note:
The mean of groups in the homogenous subset is displayed. The sum of squares for error (SSE) = .002 based on the observed means. (Same below)
a. Sample harmonic mean = 9.000. b. Alpha =. 05.

As shown in Table 5, the analysis results of the differences in the thickness of the filler layer (factor B) indicate that the salt content in the planting soil is positively correlated with the thickness of the filler layer, and the salt contents correspond to the thicknesses 10 cm, 20 cm and 30 cm are 0.184 g/l (0.11%), 0.200 g/l (0.15%) and 0.251 g/l (0.17%), respectively. The salt content in the groundwater is higher at a greater thickness (i.e. greater digging depth), where the water is easier to move upward to bring more salt. Therefore, it is recommended that the thickness of the filler layer be 10 cm to preferentially play the salt isolation effect of the rain garden.

TABLE 5

Salt content of planting soil layer at different levels of factor B

| Thickness of filler layer (cm) | Total samples | Subset 1 | Subset 2 |
|---|---|---|---|
| 10.00 | 9 | 0.183778 | — |
| 20.00 | 9 | 0.199778 | 0.199778 |
| 30.00 | 9 | — | 0.25111 |

As shown in Table 6, the analysis results of the location of the salt barrier (factor C) show that the location of the salt barrier has no significant effect on the salt content of the planting soil, but the salt isolation effect of the salt barrier tends to be better as the salt barrier is closer to the surface (i.e. the planting layer). The locations of the salt barrier from the top down correspond to the salt contents of 0.189 g/l (0.11%), 0.207 g/l (0.12%) and 0.238 g/l (0.14%), respectively. The monitoring time can be prolonged and the vertical difference in the location of the salt barrier can be increased for further verification in the follow-up study.

TABLE 6

Salt content of planting soil at different levels of factor C

| Location of salt barrier | Total samples | Subset 1 |
|---|---|---|
| Between planting layer and transition layer | 9 | 36.8889 |
| Between filler layer and drainage layer | 9 | 37.7778 |
| Between drainage layer and saline layer | 9 | — |
| Significance | — | 0.928 |

(3) Effect of salt-isolated rain garden on the hydrological characteristics of runoff. A simulation experiment was carried out to study changes of experimental indexes such as outflow flood peak delay, total reduction rate, infiltration rate (IR) and water storage rate of different salt-isolated rain garden structures. The main factors affecting the hydrological storage effect and the differences at different levels were analyzed based on the experimental data (significance and difference analysis).

The effects of structural parameter variables on the flood peak delay were derived by experiments, as follows:

The SPSS was used to carry out a variance test on the experimental data of the flood peak delay. The results show that the material of the salt barrier had an extremely significant effect on the flood peak delay (significance≤0.01); the location of the salt barrier also had an extremely significant effect on the flood peak delay (significance≤0.01); the thickness of the filler layer had a significant effect on the flood peak delay (significance≤0.05). The comparison of the variances shows that the effects of the three factors on the flood peak delay are ranked as follows: the material of the salt barrier>the location of the salt barrier>the thickness of the filler layer (Table 7). Therefore, to preferentially play the flood peak delay function of the rain garden, priority should be given to the material of the salt barrier, followed by the location of the salt barrier, and finally the thickness of the filler layer.

TABLE 7

Variance analysis on the flood peak delay of various factors

| Source | Type III sum of squares | DF | Mean square | F. stat | Significance |
|---|---|---|---|---|---|
| Corrected model | 2310.222a | 6 | 385.037 | 14.782 | 0 |
| Intercept | 41614.815 | 1 | 41614.815 | 1597.611 | 0 |
| Material of salt barrier | 1645.407 | 2 | 822.704 | 31.584 | 0 |
| Thickness of filler layer | 203.852 | 2 | 101.926 | 3.913 | 0.037 |
| Location of salt barrier | 460.963 | 2 | 230.481 | 8.848 | 0.002 |
| Error | 520.963 | 20 | 26.048 | — | — |
| Total | 44446 | 27 | — | — | — |
| Total after correction | 2831.185 | 26 | — | — | — |

Note:
R-squared = .816 (adjusted R-squared = .761).

The differences in the flood peak delay capabilities of the materials of the salt barrier, such as the river sand, zeolite and ceramsite, were compared, as shown in Table 8. The results show that among the materials of the salt barrier (factor A), the zeolite has the longest flood peak delay, 49.00 min; the ceramsite has the longer flood peak delay, 38.89 min; the river sand has the shortest flood peak delay, 28.89 min. Among the three salt isolation materials, the zeolite has the largest porosity and realizes the most efficient infiltration of stormwater runoff. In addition, the zeolite has an adsorption function, which increases the viscous effect on the runoff. Therefore, the zeolite has the longest flood peak delay. The river sand has the smallest porosity and particle size, which produce small voids and create a large resistance to runoff infiltration. Therefore, the river sand has the smallest flood peak delay. Therefore, the zeolite has the best flood peak delay effect to serve as the salt barrier of the rain garden.

TABLE 8

Flood peak delay at different levels of factor A

| Material of salt barrier | Total samples | Subset | | |
| | | 1 | 2 | 3 |
|---|---|---|---|---|
| River sand | 9 | 29.8889 | — | — |
| Ceramsite | 9 | — | 38.8889 | — |
| Zeolite | 9 | — | — | 49 |
| Significance | — | 1.000 | 1.000 | 1.000 |

Note:
The mean of groups in the homogenous subset is displayed. The sum of SSE = .26.048 based on the observed means.

As shown in Table 9, when the thickness of the filler layer (factor B) is 30 cm, the delay time is the longest, 43.11 min; when the thickness is 20 cm and 10 cm, the delay time is shorter, which is 37.78 min and 36.89 min, respectively. The flood peak delay increases with the thickness of the filler layer, and the two tend to have a significant positive correlation. Some other related experimental studies have also proved the linear growth relationship between the outflow delay and the height of the filler layer. A thicker filler layer leads to a greater water storage capacity of the device, which generates a greater water pressure for the structure with the same bottom area, thereby promoting stormwater infiltration and delaying the flood peak. However, as the above-mentioned coastal saline areas usually have a too high groundwater level, it is impossible to dig too deep in actual projects. Therefore, the thickness of the filler layer should be kept within 30 cm as much as possible.

TABLE 9

Flood peak delay at different levels of factor B

| Thickness of filler layer (cm) | Total samples | Subset | |
| | | 1 | 2 |
|---|---|---|---|
| 10.00 | 9 | 36.8889 | — |
| 20.00 | 9 | 37.7778 | 37.7778 |
| 30.00 | 9 | — | 43.1111 |
| Significance | — | 0.928 | 0.093 |

As shown in Table 10, the experimental results of factor C show that when the salt barrier is located between the filler layer and the drainage layer, the flood peak delay is 44.44 min; when the salt barrier is located between the drainage layer and the saline layer, the flood peak delay is 39 min; when the salt barrier is located between the planting layer and the transition layer, the flood peak delay is 34.33 min. The filler layer plays a major role in flood peak delay. Compared with other layers, the salt barrier has smaller particle size and higher surface roughness. Therefore, the salt barrier has a better viscous effect on the runoff when it is located at a lower location. Therefore, to play the flood peak delay effect of the salt-isolated rain garden, the optimal location of the salt barrier is between the filler layer and the drainage layer.

TABLE 10

Flood peak delay at different levels of factor C

| Location of salt barrier | Total samples | Subset | |
| | | 1 | 2 |
|---|---|---|---|
| Between planting layer and transition layer | 9 | 34.3333 | — |
| Between drainage layer and saline layer | 9 | 39 | 39 |
| Between filler layer and drainage layer | 9 | — | 44.4444 |
| Significance | — | 0.154 | 0.085 |

In this example, the effects of structural parameter variables on the total runoff reduction rate were derived by experiments, as follows:

A variance test was carried out on the total runoff reduction rate of different experimental groups. The test results show that the effects of the material of the salt barrier and the thickness of the filler layer on the total runoff reduction rate are extremely significant (significance≤0.01), and the effect of the location of the salt barrier (factor C) on the total runoff reduction rate is significant (significance≤0.05). The comparison of the variances shows that the effects of the three factors on the total reduction rate are ranked as follows: the material of the salt barrier>the thickness of the filler layer>the location of the salt barrier (Table 11). Therefore, to preferentially play the runoff reduction function of the rain garden, priority should be given to the material of the salt barrier, followed by the thickness of the filler layer, and finally the location of the salt barrier.

TABLE 11

Variance analysis on the total reduction rate of various factors

| Source | Type III sum of squares | DF | Mean square | F stat | Significance |
|---|---|---|---|---|---|
| Corrected model | .134a | 6 | 0.022 | 11.224 | 0 |
| Intercept | 4.407 | 1 | 4.407 | 2211.652 | 0 |
| Material of salt barrier | 0.08 | 2 | 0.04 | 19.996 | 0 |
| Thickness of filler layer | 0.037 | 2 | 0.019 | 9.326 | 0.001 |
| Location of salt barrier | 0.017 | 2 | 0.009 | 4.351 | 0.027 |
| Error | 0.04 | 20 | 0.002 | — | — |
| Total | 4.581 | 27 | — | — | — |
| Total after correction | 0.174 | 26 | — | — | — |

Note:
R-squared = .771 (adjusted R-squared = .702).

In this example, the differences in the total runoff reduction rate at various levels were derived through experiments. As shown in Table 12, the differences in the total runoff reduction rate of the materials of the salt barrier, such as river sand, zeolite and ceramsite, are compared. The results show that in factor A, the river sand has the highest total runoff reduction rate, 46.56%, and the zeolite has the lowest total runoff reduction rate, 33.34%.

The river sand has small porosity and particle size, which leads to slow runoff infiltration, so the total runoff from the system via the seepage facility is small. The zeolite has large porosity, which leads to fast infiltration of the stormwater runoff, so the amount of water retained in the system is significantly smaller than other materials. Therefore, the zeolite has the smaller total reduction rate in the same experimental period. To play the runoff reduction function, it is recommended that the salt barrier adopt river sand, followed by ceramsite.

TABLE 12

Total runoff reduction rate at different levels of factor A

| Material of salt barrier | Total samples | Subset 1 | Subset 2 |
|---|---|---|---|
| Zeolite | 9 | 0.333444 | — |
| Ceramsite | 9 | — | 0.412911 |
| River sand | 9 | — | 0.465611 |
| Significance | — | 1 | 0.053 |

Note:
The mean of groups in the homogenous subset is displayed. The sum of SSE = .002 based on the observed means. (Same below)

As shown in Table 13, when the thickness of the filler layer (factor B) is 30 cm, the total reduction rate is the largest, 44.61%; when the thickness is 20 cm and 10 cm, the total reduction rate is 41.01% and 35.58%, respectively, showing that the total reduction rate increases with the thickness. A greater thickness of the filler layer yields a greater water storage space in the system, which can store more stormwater runoff in a certain period of time, thereby leading to a higher runoff reduction rate. Considering that the groundwater level in coastal saline areas is too high, it is recommended that the thickness of the filler layer be in the range of 20-30 cm.

TABLE 13

Total runoff reduction rate at different levels of factor B

| Thickness of filler layer (cm) | Total samples | Subset 1 | Subset 2 |
|---|---|---|---|
| 10.00 | 9 | 0.3558 | — |
| 20.00 | 9 | — | 0.410111 |
| 30.00 | 9 | — | 0.446056 |
| Significance | — | 1 | 0.227 |

As shown in Table 14, the experimental results of factor C show that there is a significant correlation between the vertical changes in the location of the salt barrier and the total runoff reduction rate. The total runoff reduction rate increases as the salt barrier is closer to the surface, which is respectively 43.71%, 39.93% and 37.56% from top down. Compared with other layers, the salt barrier has smaller particle size and higher surface roughness, and has a better runoff reduction effect when it is located at an upper location. Therefore, to preferentially play the total runoff reduction rate of the rain garden, it is recommended that the salt barrier be located between the planting layer and the transition layer.

TABLE 14

Total runoff reduction rate at different levels of factor C

| Location of salt barrier | Total samples | Subset 1 | Subset 2 |
|---|---|---|---|
| Between drainage layer and saline layer | 9 | 0.375544 | — |
| Between filler layer and drainage layer | 9 | 0.399333 | 0.399333 |
| Between planting layer and transition layer | 9 | — | 0.437089 |
| Significance | — | 0.507 | 0.197 |

In this example, the effects of structural parameter variables on the IR were derived by experiments, as follows:

A variance test was carried out on the IR of the rain garden in different experimental groups. The results show that the material of the salt barrier (factor A) has an extremely significant effect on the IR (significance≤0.01); the location of the salt barrier (factor C) has a significant effect on the IR (significance≤0.05); the thickness of the filler layer (factor B) has no significant effect on the IR (significance>0.05). The variance analysis shows that the effects of the three factors on the IR are ranked as follows: the material of the salt barrier>the location of the salt barrier>the thickness of the filler layer (Table 15). Therefore, to construct a rain garden suitable for a coastal saline area and highlight the IR of the rain garden, priority should be given to the material of the salt barrier, followed by the location of the salt barrier, and finally the thickness of the filler layer.

TABLE 15

Variance analysis on the IR of various factors

| Source | Type III sum of squares | DF | Mean square | F stat | Significance |
|---|---|---|---|---|---|
| Corrected model | .005a | 6 | 0.001 | 12.817 | 0 |
| Intercept | 0.021 | 1 | 0.021 | 313.75 | 0 |
| Material of salt barrier | 0.004 | 2 | 0.002 | 32.773 | 0 |

TABLE 15-continued

Variance analysis on the IR of various factors

| Source | Type III sum of squares | DF | Mean square | F stat | Significance |
|---|---|---|---|---|---|
| Thickness of filler layer | 0 | 2 | 0 | 1.801 | 0.191 |
| Location of salt barrier | 0.001 | 2 | 0 | 3.876 | 0.038 |
| Error | 0.001 | 20 | 6.68E–05 | — | — |
| Total | 0.027 | 27 | — | — | — |

Note:
R-squared = .794 (adjusted R-squared = .732).

As shown in Table 16, the means of the three levels of factor A are compared, and the results show that the zeolite has the largest IR, 0.043 mm/s; the ceramsite has the larger IR, 0.028 mm/s; the river sand has the smallest IR, 0.012 mm/s. The river sand has the lowest porosity, which leads to poor infiltration inside and slow infiltration of the runoff. The ceramsite has the largest particle size, and the planting soil is easy to dope into the ceramsite, which affects the infiltration. The zeolite has the moderate particle size and the largest porosity, so it has the best stormwater infiltration effect when it forms the salt barrier.

TABLE 16

IR at different levels of factor A

| Location of salt barrier | Total samples | Subset 1 | Subset 2 | Subset 3 |
|---|---|---|---|---|
| Between drainage layer and saline layer | 9 | 0.375544 | — | — |
| Between filler layer and drainage layer | 9 | 0.399333 | 0.399333 | — |
| Between planting layer and transition layer | 9 | — | 0.437089 | 0.043228 |
| Significance | — | 0.507 | 0.197 | .700 |

Note:
The mean of groups in the homogenous subset is displayed. The sum of SSE = 6.682E–5 based on the observed means. (Same below)

As shown in Table 17, the experimental results show that there is no significant correlation between the changes in the thickness of the filler layer (factor B) and the IR, but there is a tendency that the IR increases with the thickness. When the thickness of the filler layer is 30 cm, the IR is the largest, 0.032 mm/s; when the thickness of the filler layer is 10 cm, the IR is the smallest, 0.025 mm/s. The increase in the thickness of the filler layer leads to an increase in the overall water pressure in the device, which promotes the infiltration. In case the runoff is saturated, the change in the water pressure caused by the increase of the thickness in units of 10 cm has little effect on the infiltration.

TABLE 17

IR at different levels of factor B

| Thickness of filler layer (cm) | Total samples | Subset 1 |
|---|---|---|
| Between drainage layer and saline layer | 9 | 0.375544 |
| Between filler layer and drainage layer | 9 | 0.399333 |
| Between planting layer and transition layer | 9 | — |
| Significance | — | 0.507 |

As shown in Table 18, the experimental results of factor C indicate that the IR tends to decrease as the location of the salt barrier is closer to the surface, and the IR is respectively 0.024, 0.026 and 0.034 mm/s from top down. The overall particle size of the salt isolation material is small, and a higher location of the salt barrier produces a greater resistance to the infiltration of stormwater. It can be speculated that the structural layer with a lower location plays a major role in delaying the flood peak and promoting the infiltration. Therefore, it is better to facilitate the infiltration by combining a salt isolation material with a better infiltration effect with the drainage layer. To preferentially play the infiltration function of the rain garden, it is recommended that the salt barrier be located between the drainage layer and the saline layer.

TABLE 18

IR at different levels of factor C

| Thickness of filler layer | Total samples | Subset 1 | Subset 2 |
|---|---|---|---|
| Between planting layer and transition layer | 9 | 0.023637 | — |
| Between filler layer and drainage layer | 9 | 0.026059 | 0.026059 |
| Between drainage layer and saline layer | 9 | — | 0.0339 |
| Significance | — | 0.806 | 0.13 |

In this example, the effects of structural parameter variables on the water storage rate were derived by experiments, as follows:

A variance test was carried out on the water storage rate of different experimental groups. The results show that the effects of the material of the salt barrier and the thickness of the filler layer on the water storage rate are extremely significant (significance≤0.01), and the effect of the location of the salt barrier (factor C) on the water storage is insignificant (significance>0.05). The variance analysis shows that the effects of the three factors on the water storage rate are ranked as follows: the thickness of the filler layer>the material of the salt barrier>the location of the salt barrier (Table 19). Therefore, to play the water storage function of the rain garden in an application practice, it is recommended to give priority to the thickness of the filler layer, followed by the material of the salt barrier, and finally the location of the salt barrier.

TABLE 19

Variance analysis on the water storage rate of various factors

| Source | Type III sum of squares | DF | Mean square | F stat | Significance |
|---|---|---|---|---|---|
| Corrected model | .045a | 6 | 0.008 | 5.156 | 0.002 |
| Intercept | 2.286 | 1 | 2.286 | 1558.659 | 0 |

TABLE 19-continued

Variance analysis on the water storage rate of various factors

| Source | Type III sum of squares | DF | Mean square | F stat | Significance |
|---|---|---|---|---|---|
| Material of salt barrier | 0.02 | 2 | 0.01 | 6.983 | 0.005 |
| Thickness of filler layer | 0.025 | 2 | 0.012 | 8.477 | 0.002 |
| Location of salt barrier | 2.58E−05 | 2 | 1.29E−05 | 0.009 | 0.991 |
| Error | 0.029 | 20 | 0.001 | — | — |
| Total | 2.36 | 27 | — | — | — |
| Total after correction | 0.075 | 26 | — | — | — |

Note:
R-squared = .607 (adjusted R-squared = .490).

In this example, the differences in the water storage rate at various levels were derived by experiments, as follows:

As shown in Table 20, the means at the three levels of the same factor are compared. The results show that the levels of factor A have an extremely significant effect on the water storage rate of the rain garden, and the water storage rate of the river sand and the zeolite reach 31.88% and 30.06%, respectively. The river sand has smaller particle size so that it is easy to stack the particles to form a larger external water storage space. The zeolite has larger porosity which makes it possible to store more water inside. Therefore, the river sand and the zeolite have better water storage capabilities as the salt barrier of the rain garden, and it is recommended to give priority to the river sand to preferentially play the water storage capability of the rain garden.

TABLE 20

Water storage rate at different levels of factor A

| Material of salt barrier | Total samples | Subset 1 | Subset 2 |
|---|---|---|---|
| Ceramsite | 9 | 0.253447 | — |
| Zeolite | 9 | — | 0.300626 |
| River sand | 9 | — | 0.318799 |
| Significance | — | 1 | 0.581 |

Note:
The mean of groups in the homogenous subset is displayed. The sum of SSE = .001 based on the observed means. (Same below)

As shown in Table 21, the thickness of the filler layer (factor B) has the most significant effect on the water storage rate of the rain garden. When the thickness is 10 cm, the water storage rate is the largest, 33.03%, and when the thickness is 20 cm and 30 cm, the water storage rate is 28.62% and 25.64%, respectively. This shows an obvious tendency that the water storage decreases as the thickness increases. When the runoff inflow of the system is basically saturated, the increase in the thickness of the filler layer does not contribute much to the total storage capacity of the device, but it will significantly increase the volume of the rain garden, resulting in a decrease in the water storage rate. Therefore, the water storage rate of the rain garden is the largest when the thickness of the filler layer is 10 cm.

TABLE 21

Water storage rate at different levels of factor B

| Thickness of filler layer (cm) | Total samples | Subset 1 | Subset 2 |
|---|---|---|---|
| 30 | 9 | 0.256404 | — |
| 20 | 9 | 0.286193 | 0.286193 |
| 10 | 9 | — | 0.330276 |
| Significance | — | 0.249 | 0.06 |

As shown in Table 22, the location of the salt barrier (factor C) has no significant effect on the water storage rate. When the salt barrier is located between the planting layer and the transition layer, the water storage rate is the largest, 29.23%; when the salt barrier is located between the filler layer and the drainage layer, the water storage rate is the smallest, 28.99%.

TABLE 22

Water storage rate at different levels of factor C

| Location of salt barrier | Total samples | Subset 1 |
|---|---|---|
| Between filler layer and drainage layer | 9 | .289916 |
| Between drainage layer and saline layer | 9 | .290693 |
| Between planting layer and transition layer | 9 | .292264 |
| Significance | — | .991 |

In this example, the four parameters of the rain garden, i.e. the outflow peak delay, the total reduction rate, the IR and the water storage rate are used to indicate the effect of the rain garden on the hydrological characteristics of stormwater. The outflow flood peak delay is closely correlated to the IR, and the two together represent the rain garden's ability to infiltrate the stormwater. In general, better infiltration leads to longer delay and later flood peak. There is a strong correlation between the total reduction rate and the water storage rate, and the two together show the retention and storage capacity of the rain garden for stormwater runoff.

In this example, it can be found from the test data that the main factors affecting the infiltration capacity of the rain garden include the porosity and particle size of the material used for the salt barrier and the location of the salt barrier. A salt isolation material with large porosity has good infiltration inside, which leads to high infiltration efficiency of the stormwater runoff and prolongs the outflow flood peak delay. A salt isolation material with small particle size produces small voids, which cause a large resistance to the infiltration of runoff and shorten the flood peak delay. It has been found that the filler layer plays a major role in the infiltration of the rain garden, and it can be speculated that the structural layer with a lower position plays a major role in delaying the flood peak and promoting infiltration. In addition, as the salt barrier has small particle size and high surface roughness, it has a better runoff infiltration effect when it is located at a lower position.

The main factors affecting the total reduction rate and water storage rate include: the porosity and particle size of the material used for the salt barrier and the thickness of the filler layer. A material with small porosity and small particle size makes the infiltration of runoff slow, so the total runoff outflowing from the system via the seepage facility is small.

Meanwhile, as the particles are easy to stack, a larger external water storage space is formed. Similarly, the filler layer produces a larger water storage capacity of the system when it has a larger thickness. The effect of the thickness of the filler layer on the water storage rate shows different trends. As the amount of water in the device is saturated in the state of water storage, an increase in the thickness of the filler layer increases the volume of the rain garden, thereby resulting in a decrease in the water storage rate.

(4) Effect of salt-isolated rain garden on the hydrological characteristics of runoff. A simulation experiment was carried out to study the reduction rates of different salt-isolated rain garden structures on chemical oxygen demand (OCD), total phosphorus (TP) and total nitrogen (TN). The main factors affecting the water purification effect and the differences at different levels were analyzed based on the experimental data (significance and difference analysis).

This example studies the purification effect of the salt-isolated rain garden on the stormwater runoff based on the three key indicators, i.e. the COD, TN and TP reduction rates. This example analyzes the significant relationship between the three factors (the material of the salt barrier, the location of the salt barrier and the thickness of the filler layer) and the above indicators, the differences between the three levels of each factor and the causes for the differences. In this way, the example can design the rain garden structure with different functions based on these variables.

The effects of structural parameter variables on the COD reduction rate were derived by experiments, as follows:

A variance test was carried out on the COD reduction rate by using the SPSS. The results show that the effects of the material of the salt barrier and the thickness of the filler layer on the COD reduction rate are significant (significance≤0.05), and the effect of the location of the salt barrier (factor C) on the COD reduction rate is extremely significant (significance≤0.01). The variance analysis shows that the effects of the three factors on the water storage rate are ranked as follows: the location of the salt barrier>the material of the salt barrier>the thickness of the filler layer (Table 23). Therefore, to design the salt-isolated rain garden at a site with severe COD pollution, priority should be given to the location of the salt barrier, followed by the material of the salt barrier, and finally the thickness of the filler layer.

TABLE 23

Variance analysis on the COD reduction rate of various factors

| Source | Type III sum of squares | DF | Mean square | F stat | Significance |
|---|---|---|---|---|---|
| Corrected model | .111a | 6 | 0.018 | 5.323 | 0.002 |
| Intercept | 18.519 | 1 | 18.519 | 5345.461 | 0 |
| Material of salt barrier | 0.033 | 2 | 0.017 | 4.784 | 0.02 |
| Thickness of filler layer | 0.032 | 2 | 0.016 | 4.577 | 0.023 |
| Location of salt barrier | .046 | 2 | 0.023 | 6.608 | 0.006 |
| Error | 0.069 | 20 | 0.003 | — | — |
| Total | 18.699 | 27 | — | — | — |
| Total after correction | 0.18 | 26 | — | — | — |

Note:
R-squared = .615 (adjusted R-squared = .499).

The differences in the COD reduction rate at various levels were derived by experiments, as follows:

As shown in Table 24, the means of the COD reduction rate at the three levels of the same factor are compared independently. The results show that among the salt isolation materials, the river sand has the highest COD reduction rate, which is 87.77%; the zeolite and the ceramsite have almost the same COD reduction rate, 80.54% and 80.15%, respectively. Other structural layers such as the planting layer (plant roots) and the salt barrier in the rain garden physically intercept the COD through biological retention and material adsorption. Then the microbial environment in the rain garden system chemically decomposes the COD, turning the COD into elements and ions that the plant can absorb and utilize. The river sand has smaller porosity and particle size, and thus has a stronger retention and storage capacity for runoff and a stronger retention capacity for organic matter in sewage. In addition, the river sand creates a better condition for microorganisms to decompose organic matter under the state of water storage. The zeolite and the ceramsite have larger porosity, and absorb soluble organic matter by forming biofilms. The COD reduction rate of all the three materials is high, but the COD reduction rate of the river sand is the highest. Therefore, it is recommended to give priority to the river sand to preferentially play the COD reduction function of the rain garden in a saline area.

TABLE 24

COD reduction rate at different levels of factor A

| Material of salt barrier | Total samples | Subset 1 | Subset 2 |
|---|---|---|---|
| Ceramsite | 9 | 0.8015 | — |
| Zeolite | 9 | 0.805356 | — |
| River sand | 9 | — | 0.877678 |
| Significance | — | 0.989 | 1 |

Note:
The mean of groups in the homogenous subset is displayed. The sum of squares for error (SSE) = .003 based on the observed means. (Same below)

As can be seen from Table 5-3, when the thickness of the filler layer (factor B) is 30 cm, the COD reduction rate is the largest, 86.20%; when the thickness is 20 cm and 10 cm, the COD reduction rate is 84.13% and 78.12%, respectively. This shows that the reduction rate increases with the thickness. The COD in sewage is mainly intercepted by the filler layer. The filler layer in this example is planting soil, which is conducive to the survival of microorganisms to chemically decompose and remove the COD. A thick filler layer will facilitate the adsorption, settlement and decomposition of the COD. As the groundwater level in coastal saline areas is too high, it is not possible to dig a too deep filler layer, so the thickness of the filler layer is recommended to 20-30 cm.

TABLE 25

COD reduction rate at different levels of factor B

| Thickness of filler layer (cm) | Total samples | Subset 1 | Subset 2 |
|---|---|---|---|
| 10.00 | 9 | 0.781211 | — |
| 20.00 | 9 | 0.841289 | 0.841289 |
| 30.00 | 9 | — | 0.862033 |
| Significance | — | 0.102 | 0.738 |

Table 5-4 shows that the location of the salt barrier (factor C) is significantly correlated with the COD reduction rate, and the COD reduction rate increases as the salt barrier is closer to the planting layer. When the salt barrier is located between the planting layer and the transition layer, the COD reduction rate is the largest, 87.72%; when the salt barrier is located between the filler layer and the drainage layer, the COD reduction rate is 83.10%; when the salt barrier is located between the drainage layer and the saline layer, the COD reduction rate is 77.64%. The planting layer has a rich plant root system and microorganism environment, which play a major role in the adsorption and removal of organic matter. Compared with other layers, the salt barrier has smaller particle size and higher surface roughness. Therefore, it is better to intercept the organic matter into the planting layer when the salt barrier is closer to the planting layer. To construct the rain garden at a place where the main runoff pollutant is COD, it is recommended that the salt barrier be located between the planting layer and the transition layer.

TABLE 25

COD reduction rate at different levels of factor C

| Location of salt barrier | Total samples | Subset 1 | Subset 2 |
|---|---|---|---|
| Between drainage layer and saline layer | 9 | 0.776411 | — |
| Between filler layer and drainage layer | 9 | 0.830956 | 0.830956 |
| Between planting layer and transition layer | 9 | — | 0.877167 |
| Significance | — | 0.147 | 0.243 |

The effects of structural parameter variables on the TN reduction rate were derived by experiments, as follows:

A variance test was carried out on the TN reduction rate of different experimental groups. The results show that the effects of the material of the salt barrier (factor B) and the thickness of the filler layer (factor C) on the TN reduction rate are extremely significant (significance≤0.01), and the effect of the location of the salt barrier (factor C) is significant (significance≤0.05) (Table 26). The comparison of the variances shows that the TN reduction rates of the three factors are ranked as follows: the location of the salt barrier=the thickness of the filler layer>the material of the salt barrier. Therefore, to design a rain garden at a site where the TN pollution is severe, priority should be given to the location of the salt barrier and the thickness of the filler layer, followed by the material of the salt barrier.

TABLE 26

Variance analysis on the TN reduction rate of various factors

| Source | Type III sum of squares | DF | Mean square | F stat | Significance |
|---|---|---|---|---|---|
| Corrected model | .225a | 6 | 0.038 | 12.707 | 0 |
| Intercept | 15.61 | 1 | 15.61 | 5285.919 | 0 |
| Material of salt barrier | 0.033 | 2 | 0.016 | 5.557 | 0.012 |
| Thickness of filler layer | 0.101 | 2 | 0.051 | 17.113 | 0 |
| Location of salt barrier | 0.091 | 2 | 0.046 | 15.452 | 0 |
| Error | 0.059 | 20 | 0.003 | — | — |
| Total | 15.894 | 27 | — | — | — |
| Total after correction | 0.284 | 26 | — | — | — |

Note:
R-squared = .792 (adjusted R-squared = .730).

The differences in the TN reduction rate at various levels were derived by experiments, as follows:

Table 27 shows that among the materials of the salt barrier (factor A), the river sand has the largest TN reduction rate, 80.22%; the ceramsite has the smallest TN reduction rate, 71.69%. The nitrogen in the runoff is mainly $NH_4^+$ and $NO_3^-$, which can be decomposed by the denitrification of bacteria [50]. The river sand has small porosity and particle size, which lead to snow infiltration of runoff. The zeolite has large porosity and large internal water storage capacity. Compared with the ceramsite, the river sand and the zeolite can form a high-humidity internal environment, which is more conducive to the cultivation of denitrifying bacteria and the occurrence of denitrification reactions. Therefore, to preferentially play the TN reduction function of the rain garden in a saline area, it is recommended to give priority to the river sand as the salt barrier, followed by the zeolite.

TABLE 27

TN reduction rate at different levels of factor A

| Material of salt barrier | Total samples | Subset 1 | Subset 2 |
|---|---|---|---|
| Zeolite | 9 | 0.716878 | — |
| Ceramsite | 9 | 0.761978 | 0.761978 |
| River sand | 9 | — | 0.802233 |
| Significance | — | 0.208 | 0.281 |

Note:
The mean of groups in the homogenous subset is displayed. The sum of squares for error (SSE) = .003 based on the observed means. (Same below)

It can be seen from Table 28 that the reduction rate increases with the thickness of the filler layer. When the thickness is 30 cm, the TN reduction rate is the largest, 82.68%; when the thickness is 20 cm and 10 cm, the TN reduction rate is 77.52% and 67.91%, respectively. The filler layer is planting sandy soil with many compounds such as $SiO_2$ and $Al_2O_3$, which are easy to combine with $NH_4^+$ in sewage. In addition, a thicker filler layer can provide a larger nitrification reaction environment, which is more conducive to the nitrification of nitrogen. Therefore, as the thickness of the filler layer increases, the TN reduction capability of the filler layer also increases. Considering that the groundwater level in coastal saline areas is too high, it is recommended that the thickness of the filler layer be 20-30 cm at a site where the main runoff pollutant is TN.

TABLE 28

TN reduction rate at different levels of factor B

| Thickness of filler layer (cm) | Total samples | Subset 1 | Subset 2 |
|---|---|---|---|
| 10.00 | 9 | 0.679111 | — |
| 20.00 | 9 | — | 0.775222 |
| 30.00 | 9 | — | 0.826756 |
| Significance | — | 1 | 0.135 |

As shown in Table 29, there is a significant correlation between the vertical changes in the location of the salt barrier and the TN reduction rate. The experimental results of factor C indicate that the TN reduction effect is better when the location of the salt barrier is closer to the filler layer. When the salt barrier is located between the filler layer and the drainage layer, the TN reduction rate is the largest, 84.24%; when the salt barrier is located between the planting layer and the transition layer or between the drainage layer and the saline layer, the TN reduction rate is the smallest, which is 72.44% and 71.43%, respectively. The nitrification-denitrification of microorganisms in the rain garden mainly occurs in the planting layer and the filler layer. When the salt isolation material is located below the filler layer, it has a good interception effect on pollutants in the runoff and in the salt isolation material itself. Thus, the planting layer and the filler layer can maintain a humid state for a longer period of time and constitute an anaerobic environment that is more suitable for the propagation and nitrification of nitrifying bacteria. When the runoff flows to the drainage layer, due to the good infiltration effect of the drainage layer, the runoff flows out quickly without being properly reduced and filtered, thereby resulting in a decrease in the reduction rate. Therefore, it is recommended that the salt barrier be located between the filler layer and the drainage layer at a site where the main runoff pollutant is TN.

TABLE 29

TN reduction rate at different levels of factor C

| Location of salt barrier | Total samples | Subset 1 | Subset 2 |
|---|---|---|---|
| Between drainage layer and saline layer | 9 | 0.714311 | — |
| Between planting layer and transition layer | 9 | 0.7244 | — |
| Between filler layer and drainage layer | 9 | — | 0.842378 |
| Significance | — | 0.918 | 1 |

The effects of structural parameter variables on the TP reduction rate were derived by experiments, as follows:

A variance test was carried out on the TP reduction rate of the rain garden in the experimental groups. The results show that the significance of factors A and B is ≤0.01, indicating that the material of the salt barrier and the thickness of the filler layer have an extremely significant effect on the TP reduction rate of the rain garden. The significance of factor C is ≤0.05, indicating that the location of the salt barrier has a significant effect on the TP reduction rate (Table 30). The variance analysis of the three factors show that the effects of the three factors on the TP reduction rate are ranked as follows: the material of the salt barrier>the thickness of the filler layer>the location of the salt barrier. Therefore, to design the salt-isolated rain garden at a site with severe TP pollution, priority should be given to the material of the salt barrier, followed by the thickness of the filler layer, and finally the location of the salt barrier.

TABLE 30

Variance analysis on the TP reduction rate of various factors

| Source | Type III sum of squares | DF | Mean square | F stat | Significance |
|---|---|---|---|---|---|
| Corrected model | .005a | 6 | 0.092 | 11.425 | 0 |
| Intercept | 0.021 | 1 | 20.394 | 2536.844 | 0 |
| Material of salt barrier | 0.004 | 2 | 0.177 | 22.066 | 0 |
| Thickness of filler layer | 0 | 2 | 0.068 | 8.47 | 0.002 |
| Location of salt barrier | 0.001 | 2 | 0.03 | 3.738 | 0.042 |
| Error | 0.001 | 20 | 0.008 | — | — |
| Total | 0.027 | 27 | — | — | — |
| Total after correction | 0.006 | 26 | — | — | — | a: R-squared = .774 (adjusted R-squared = .706).

The differences in the TP reduction rate at various levels were derived by experiments, as follows:

Table 31 shows that the three levels of the materials of the salt barrier are significantly different. The TP reduction rate of the river sand is the largest, 96.39%; the TP reduction rate of the zeolite is larger, 93.56%; the TP reduction rate of the ceramsite is the smallest, 70.78%. The TP in the runoff is mainly reduced by the physical adsorption, chemical adsorption and microbial adsorption of the filler. With large porosity and particle size, the ceramsite forms a lot of voids inside and outside when it is accumulated. It is easy to cause the TP adsorbed by the soil layer as a sediment to be lost from the voids, resulting in an increase in the TP content in the outflow. Therefore, it is recommended to give priority to the river sand followed by the zeolite as the salt barrier at a site with severe TP pollution.

TABLE 31

TP reduction rate at different levels of factor A

| Material of salt barrier | Total samples | Subset 1 | Subset 2 |
|---|---|---|---|
| Ceramsite | 9 | 0.707822 | — |
| Zeolite | 9 | — | 0.935556 |
| River sand | 9 | — | 0.963933 |
| Significance | — | 1 | 0.783 |

Note:
The mean of groups in the homogenous subset is displayed. The sum of squares for error (SSE) = .008 based on the observed means. (Same below)

As shown in Table 32, the experimental results of the thickness of the filler layer (factor B) indicate that when the thickness of the filler layer is 30 cm, the TP reduction rate is the largest, 95.66%; when the thickness of the filler layer is 20 cm and 10 cm, the TP reduction rate is 86.81% and 78.26%, respectively. The TP reduction rate also tends to increase with the thickness. Metal ions such as $Al_3^+$ and $Ca_2^+$ in the filling medium of the rain garden form a sediment or complex with phosphorus. This reaction ensures stable TP adsorption and is commonly used to remove phosphorus in water treatment. Considering that the groundwater level in coastal saline areas is too high, it is recommended that the thickness of the filler layer be 20-30 cm at a site where the main runoff pollutant is TP.

TABLE 32

TP reduction rate at different levels of factor B

| Thickness of filler layer (cm) | Total samples | Subset 1 | Subset 2 |
|---|---|---|---|
| 10.00 | 9 | 0.782633 | — |
| 20.00 | 9 | 0.868089 | 0.868089 |
| 30.00 | 9 | — | 0.956589 |
| Significance | — | 0.133 | 0.117 |

As shown in Table 33, the experimental results of factor C indicate that when the salt barrier is located between the filler layer and the drainage layer, the TP reduction rate is the largest, 92.56%; when the salt barrier is located between the planting layer and the transition layer, the TP reduction rate is the smallest, 81.00%. This shows the same trend as the TN reduction rate. There is a significant correlation between the vertical changes in the location of the salt barrier and the TP reduction rate. The TP reduction effect is better when the location of the salt barrier is closer to the filler layer. Phosphorus is mainly removed by the filtration and adsorption of the filling medium in the rain garden. Therefore, it is recommended that the salt barrier be located between the filler layer and the drainage layer to preferentially play the TN reduction function of the rain garden.

TABLE 33

TP reduction rate at different levels of factor C

| Thickness of filler layer (cm) | Total samples | Subset 1 | Subset 2 |
|---|---|---|---|
| 10.00 | 9 | 0.782633 | — |
| 20.00 | 9 | 0.868089 | 0.868089 |
| 30.00 | 9 | — | 0.956589 |
| Significance | — | 0.133 | 0.117 |

In this example, the removal of the COD, the TN and the TP is closely related to the three factors, i.e. the material of the salt barrier, the location of the salt barrier and the thickness of the filler layer. The rain garden mainly intercepts and adsorbs pollutant ions through the plant roots and the biofilm formed on the surface of the material, and various types of microorganisms finally decompose the pollutant ions through chemical reactions. The salt isolation material has a strong retention capacity and the filling medium has a large thickness. They provide the sewage runoff with a longer filtration and reaction time in the system, and create a better microbial environment, which greatly increases the removal rate of the COD, the TN and the TP pollutants.

According to the COD, TN, and TP reduction rates of the three factors, this example works out the salt-isolated rain garden structures with the best, better and worst water purification capacities suitable for coastal saline areas.

Table 34 shows the water purification capacities of different structural variables based on the three pollutant indicators. The results show that the material of the salt barrier with the best comprehensive capacity to improve the water quality is river sand, with the highest score of 3.90; the thickness of the filler layer with the best improvement capacity is 30 cm, with a score of 3.55; the location of the salt barrier with the best capacity is between the filler layer and the drainage layer, with a score of 3.23. Based on the above results, this example recommends to use river sand as the salt barrier, set the thickness of the filler layer be 30 cm and locate the salt barrier between the filler layer and the drainage layer to build the salt-isolated rain garden in a coastal saline area with severe surface runoff pollution.

TABLE 34

Comprehensive water purification capacity of rain garden

| Experimental factor | Experimental level | Score COD reduction rate | Score TN reduction rate | Score TP reduction rate | Weighted average |
|---|---|---|---|---|---|
| Material of salt barrier | Significance ratio | 67% | 67% | 100% | — |
| | River sand | 5 | 5 | 5 | 3.90 |
| | Zeolite | 3 | 3 | 3 | 2.34 |
| | Ceramsite | 1 | 1 | 1 | 0.78 |
| Thickness of filler layer | Significance ratio | 33% | 100% | 67% | — |
| | 10 cm | 1 | 1 | 1 | 0.67 |
| | 20 cm | 3 | 3 | 3 | 2.01 |
| | 30 cm | 5 | 5 | 5 | 3.55 |
| Location of salt barrier | Significance ratio | 100% | 100% | 33% | — |
| | Between planting layer and transition layer | 5 | 1 | 1 | 2.11 |
| | Between filler layer and drainage layer | 3 | 5 | 5 | 3.23 |
| | Between drainage layer and saline layer | 1 | 3 | 3 | 1.67 |

(5) Comprehensive analysis of salt isolation, storage and purification effects of salt-isolated rain garden. A salt-isolated rain garden suitable for saline areas is proposed according to the salinization degree of the study area and the functional requirements of runoff storage and purification. There are four application modes of the salt-isolated rain garden, that is, strong-salt-isolated rain garden suitable for heavily saline areas, and a storage-oriented salt-isolated rain garden, a purification-oriented salt-isolated rain garden and a comprehensive type salt-isolated rain garden suitable for moderate to mild saline areas. The vegetation is selected based on the comprehensive conditions of soil and water.

In this example, according to the distribution characteristics of the coastal saline land in Shanghai, the current sponge city construction (SCC) plan of Nanhui New City and the functional needs of different sites for hydrology and water quality, the Nanhui New City pilot area is divided into four application areas for the rain garden. That is: heavily saline areas with severe salinization, mainly located in the bank section of Hangzhou Bay on the south side of Luchao Port; moderate to mild saline areas with severe waterlogging but mild pollution, mainly including sites with high greening degree in the northern section of Luchao Port and the downtown of Nanhui New City; moderate to mild saline areas with severe runoff pollution but low stormwater and flood pressure, mainly including sites with high hardening degree in the northern section of Luchao Port and the downtown of Nanhui New City; and extensive moderate to mild saline areas with large stormwater runoff and serious regional pollution.

There are four application modes of the salt-isolated rain garden according to the experimental results, that is, a strong-salt-isolated rain garden suitable for heavily saline areas, and a storage-oriented salt-isolated rain garden, a purification-oriented salt-isolated rain garden and a comprehensive type salt-isolated rain garden suitable for moderate to mild saline areas.

The strong-salt-isolated rain garden applies to a heavily saline area (salt content≥0.6%), which must have a good salt isolation effect. The present invention selects the structural parameters with high salt isolation capacities as follows: the material of the salt barrier: zeolite, the location of the salt barrier: between the planting layer and the transition layer, and the thickness of the filler layer: 10 cm.

The storage-oriented salt-isolated rain garden applies to moderate saline areas (salt content 0.3%-0.6%) and mild saline areas (salt content 0.1%-0.3%) with large surface runoff but mild runoff pollution. Based on a comprehensive consideration of the flood peak delay, the total reduction rate, the IR and the water storage rate which reflect the hydrological storage effects, this example recommends that the rain garden structure use zeolite as the salt barrier, locate the salt barrier between the filler layer and the drainage layer and set the thickness of the filler layer to be 20 cm.

The purification-oriented salt-isolated rain garden applies to moderate saline areas (salt content 0.3%-0.6%) and mild saline areas (salt content 0.1%-0.3%) with high hardening degree and serious runoff pollution. The present invention comprehensively considers the COD reduction rate, the TN reduction rate and the TP reduction rate which reflect the hydrological purification effect, and recommends to use river sand as the salt barrier, locate the salt barrier between the filler layer and the drainage layer and set the thickness of the filler layer to be 30 cm.

The comprehensive type salt-isolated rain garden applies to moderate saline areas (salt content 0.3%-0.6%) and mild saline areas (salt content 0.1%-0.3%) with large runoff and serious runoff pollution. This type of rain garden has good runoff storage and purification functions while meeting salt isolation requirements, and can be applied to most sites in the Nanhui New City pilot area. The structural parameters of the comprehensive type salt-isolated rain garden are selected according to the previous evaluation results of hydrology and water quality. Since the overall water quality of the Nanhui New City pilot area is acceptable, the main purpose of local rain garden construction is stormwater storage, so the weights corresponding to hydrology and water quality are 70% and 30% respectively. As shown in Table 35, the salt isolation material with the best comprehensive capacity is zeolite and river sand, with a score of 2.98; the best thickness of the filler layer is 30 cm, with a score of 2.06; the best location of the salt barrier is between the filler layer and the drainage layer, with a score of 2.09. Because the salt isolation effect of river sand is significantly lower than that of zeolite, it is not conducive to the widespread promotion of the rain garden in saline areas. Therefore, a comprehensive type salt-isolated rain garden suitable for coastal saline areas in Shanghai is constructed by using zeolite as the salt barrier, locating the salt barrier between the filler layer and the drainage layer and setting the thickness of the filler layer to be 30 cm. The sectional view of the comprehensive type salt-isolated rain garden is shown in FIG. 3.

TABLE 35

Comprehensive effects of rain garden on hydrology and water quality

| Experimental factor | Experimental level | Hydrological storage score | Water quality score | Weighted average |
|---|---|---|---|---|
| Material of salt barrier | River sand | 2.59 | 3.90 | 2.98 |
|  | Zeolite | 3.25 | 2.34 | 2.98 |
|  | Ceramsite | 2.42 | 0.78 | 1.93 |
| Thickness of filler layer | 10 cm | 1.50 | 0.67 | 1.25 |
|  | 20 cm | 1.51 | 2.01 | 1.66 |
|  | 30 cm | 1.51 | 3.55 | 2.06 |
| Location of salt barrier | Between planting layer and transition layer | 0.76 | 2.11 | 1.17 |
|  | Between filler layer and drainage layer | 1.60 | 3.23 | 2.09 |
|  | Between drainage layer and saline layer | 1.43 | 1.67 | 1.50 |

The strong-salt-isolated rain garden is suitable for sites that are close to the seashore and have high groundwater level and severe salinization (salt content>0.6%), such as the south side of Luchao Port, the bank section of Hangzhou Bay and the northern section of Chongming Island. As these heavily saline areas are less developed and rely on the highway around the sea, it is recommended that the strong-salt-isolated rain garden be constructed in the road or street green space.

The strong-salt-isolated rain garden is usually composed of 7 structural layers, which are drainage layer, filler layer, transition layer, salt barrier, planting soil layer, mulch layer and ponding layer in sequence from bottom to top (Table 36). In view of the groundwater level in the saline area, when the bottom of the strong-salt-isolated rain garden is less than 0.6 m from the groundwater, an anti-seepage membrane is laid under the drainage layer. The rain gardens should be distributed and the area should not be too large. The area of the rain garden can be estimated as 5%-10% of an impervious catchment area. The ponding layer is as thick as 0.15-0.20 m; the planting soil is a mixture of 30% of Shanghai's commonly used greening surface soil, 50% of sandy soil and 20% of peat soil. Bark or gravel is laid as a covering on the surface of the planting soil layer, and an impervious salt isolation plate is arranged around in the horizontal direction the planting layer to block the horizontal displacement of salt water. The lower part of the planting layer is a salt barrier with a thickness of 0.10 m. It is recommended to lay zeolite with a particle size of 2-4 mm to block the upward movement of salt in the vertical direction. Medium sand with a particle size of 0.35-0.50 mm is laid under the salt barrier as a transition layer. The thickness of the transition layer is generally 0.05 m, which can be adjusted according to the groundwater level. When the groundwater level is too high, a geotextile can be laid as a transition layer. The filler layer is made of planting soil, which is preferably 0.10 m in thickness. The drainage layer has a thickness of 0.10 m and is composed of gravel with a diameter of 10-20 mm. If the particle size difference of the drainage layer and the upper medium is greater than an order of magnitude, it is necessary to lay a permeable geotextile between the two to prevent the drainage layer from clogging.

The seepage structure is located at the bottom of the garden and consists of a seepage drainage pipe and a seepage pipe. The seepage pipe is located at the bottom of the drainage layer. The pipe is usually 100 mm in diameter and is perforated on all sides. The perforated pipe collects the stormwater runoff passing through the inside of the rain garden and finally discharges the stormwater runoff to the seepage drainage pipe. The drainage pipe usually has a gradient of 1-3% to connect a municipal drainage branch or stormwater well nearby.

The overflow structure is composed of the overflow pipe inside the rain garden and the overflow drain pipe at the bottom. The diameter of the overflow pipe is usually 150 mm. The uppermost part of the overflow pipe is an overflow port, and a honeycomb baffle is installed on the overflow port to prevent debris from blocking the overflow facility. The overflow drainage pipe also has a gradient of 1-3%, and is usually connected to a municipal drainage branch or stormwater well nearby.

TABLE 36

Structure of strong-salt-isolated rain garden

| Design specifications | | Material | Design parameters | Thickness (m) |
|---|---|---|---|---|
| Structural layers | Ponding layer | — | | 0.15-0.20 |
| | Mulch layer | Bark or gravel | | 0.02-0.05 |
| | Planting soil layer | Planting soil | | 0.20-0.30 |
| | Salt barrier | Zeolite with particle size of 2-4 mm | | 0.10 |
| | Transition layer | Permeable geotextile or medium sand | | 0.05 |
| | Filler layer | Planting soil | | 0.10 |
| | Drainage layer | Gravel with particle size of 10-20 mm | | 0.10 |
| Other main indicators | Design area | | $60 \pm 10$ m$^2$ | |
| | Total depth | | 0.70-0.85 m | |
| | Gradient of side slope i. | | 1/5-1/4 | |

As for plant configuration, the strong-salt-isolated rain garden should consider the conditions of the heavily saline land, and select common plants with strong salt tolerance, such as miscanthus, yriarrhena, and pennisetum and other highly tolerant plants. These plants can survive in a high-salinity environment to maintain the quality of the landscape and reduce the cost of later plant maintenance or replacement.

This rain garden adopts a typical herb configuration mode. Tall plants with widely distributed roots but no obvious rod diameter, such as miscanthus, pennisetum and pampas are planted at the bottom of the rain garden. Low plants with fast growth and large coverage, such as hylotelephium erythrostictum and stonecrop are planted on the slope protection to exert their slope protection ability. Since the strong-salt-isolated rain garden is mostly constructed in the road green space in heavily saline areas, it can also plant shrubs such as tamarix and prunus maritima according to the plant configuration of the road green belt to create a three-dimensional rain garden landscape with other plants.

This example was experimented in Shanghai Lingang. The heavily saline area on the south side of Luchao Port in Shanghai includes ecological areas to be built and a small amount of public green space. The SCC in this area is mainly carried out around the city's main roads such as bank road and Lianggang Avenue. The strong-salt-isolated rain garden is usually constructed in the road or street green space in this area. The two construction sites are similar and the practical application effect is demonstrated by taking the road green space as an example.

Figure 4:
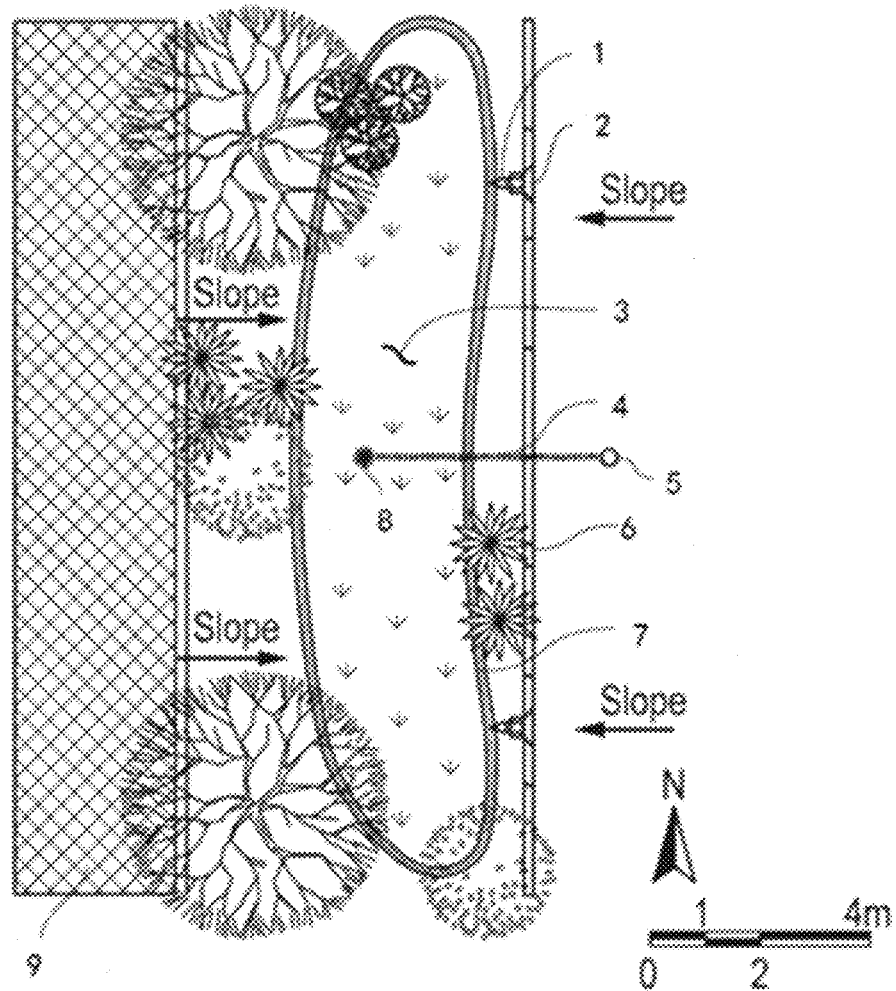
FIG. 4 is a plan view of a strong-salt-isolated rain garden applied to a road green space according to an example of the present invention. Reference Numerals in FIG. 4 are as follows: 1. PVC water inlet pipe; 2. Curb opening (water inlet); 3. Strong-salt isolated rain garden; 4. Underground stormwater pipe; 5. Stormwater well; 6. Curb; 7. Slope gravel; 8. Overflow port; 9. Sidewalk.

The strong-salt-isolated rain garden can be applied to the isolation belt between the motorway and the bicycle lane or the green belt on the side of the road, so as to efficiently treat the runoff generated by the motorway and the sidewalk when it rains. This avoids the accumulation of road water, reduces the pollutant content of surface runoff, reduces the burden of the urban drainage system and protects the water source of the nearby Dishui Lake. The integration of the rain garden technology and road greening landscape can form a characteristic sponge city road green space landscape. Since the road green belt itself has a certain area, it can meet the design requirements of the rain garden, and there is no need to carry out large-scale engineering transformation in SCC. Therefore, the scheme is economical. The sectional view and structural parameters of this type of rain garden applied to road green space are shown in Table 36, and the plan is shown in FIG. 4.

In this example, the storage-oriented salt-isolated rain garden can quickly deal with stormwater runoff. It is suitable for areas with a certain distance from the seaside, serious waterlogging, and mild salinization (salt content 0.1%-0.6%). This type of rain garden applies to park green space and other sites featuring severe waterlogging and serious infiltration on the northern bank section of Luchao Port, the southern bank section of Chongming Island, Changxing Island, Hengsha Island, Tuanjiesha and the downtown of Nanhui New City.

The storage-oriented salt-isolated rain garden is also usually composed of 7 structural layers, which are drainage layer, salt barrier, filler layer, transition layer, planting soil layer, mulch layer and ponding layer in sequence from bottom to top. Considering that the storage-oriented salt-isolated rain garden is faced with heavy rain, it is recommended to use pebbles and other materials to arrange the slope protection structure around the rain garden, so as to reduce the structural damage and soil erosion caused by the heavy rain. The ponding layer is as thick as 0.15-0.20 m; the planting soil is a mixture of 30% of Shanghai's commonly used greening surface soil, 50% of sandy soil and 20% of peat soil. Bark or gravel is laid as a covering on the surface of the planting soil layer, and an impervious salt isolation plate is arranged around in the horizontal direction the planting layer to block the horizontal displacement of salt water. Medium sand with a particle size of 0.35-0.50 mm is laid as a transition layer. The thickness of the transition layer is generally 0.05 m, which can be adjusted according to the groundwater level. When the groundwater level is too high, a geotextile can be laid as a transition layer. The filler layer is made of planting soil, which is preferably 0.10 m in thickness. The lower part of the filler layer is a salt barrier with a thickness of 0.20 m. It is recommended to lay zeolite with a particle size of 2-4 mm to block the upward movement of salt under the premise of ensuring infiltration. The drainage layer under the salt barrier has a thickness of 0.10 m and is composed of gravel with a diameter of 10-20 mm. If the particle size difference of the drainage layer and the upper medium is greater than an order of magnitude, it is necessary to install a permeable geotextile between the two to prevent the drainage layer from clogging. The structure of the water seepage and overflow facilities of this type of rain garden is the same as those of the strong-salt-isolated rain garden above. The sectional view of the storage-oriented salt-isolated rain garden is shown in FIG. 3.

TABLE 37

Structure of storage-oriented salt-isolated rain garden

| Design specifications | | Material | Design parameters | Thickness (m) |
|---|---|---|---|---|
| Structural layers | Ponding layer | — | | 0.15-0.20 |
| | Mulch layer | Bark or gravel | | 0.02-0.05 |
| | Planting soil layer | Planting soil | | 0.20-0.30 |
| | Transition layer | Permeable geotextile or medium sand | | 0.05 |
| | Filler layer | Planting soil | | 0.20 |
| | Salt barrier | Zeolite with particle size of 2-4 mm | | 0.10 |
| | Drainage layer | Gravel with particle size of 10-20 mm | | 0.10 |
| Other main indicators | Design area | | 60 ± 10 m² | |
| | Total depth | | 0.80-0.95 m | |
| | Gradient of side slope i. | | 1/5-1/4 | |

The storage-oriented salt-isolated rain garden applies to moderate to mild saline areas with mild runoff pollution but large surface runoff. This type of rain garden will face short-tem flooding when dealing with heavy rain, but due to its good infiltration capacity, it can quickly reduce the stormwater runoff. Therefore, the plant configuration of this rain garden should take into account the short-term waterlogging tolerance and long-term drought tolerance of plants.

The storage-oriented salt-isolated rain garden is usually constructed in the park green space, so its plant configuration should consider the theme landscape of the park green space. Multicolored, flowering perennial herbs, such as iris, lythrum, hemerocallis, scrophulariaceae, stonecrop and hylotelephium erythrostictum are planted at important landscape nodes to combine with shrubs to enhance the aesthetics and quality of the landscape. Miscanthus sinensis, miscanthus, Arundo donax and other grass plants are planted at other landscape nodes to ensure functionality and reduce construction costs.

This example was experimented in Shanghai. In the northern bank section of Shanghai Luchao Port and Nanhui New City, the infrastructure constructions are complete, including a series of large-scale parks such as Dishui Lake Park and Haichang Ocean Park. The park green space in the coastal area has high greening rate, good ecological benefit and mild runoff pollution, but the soil is sticky and the IR is low. Therefore, the sponge facility in the park green space aims to solve the problem of infiltration, and it is recommended to construct the storage-oriented salt-isolated rain garden.

Figure 5:
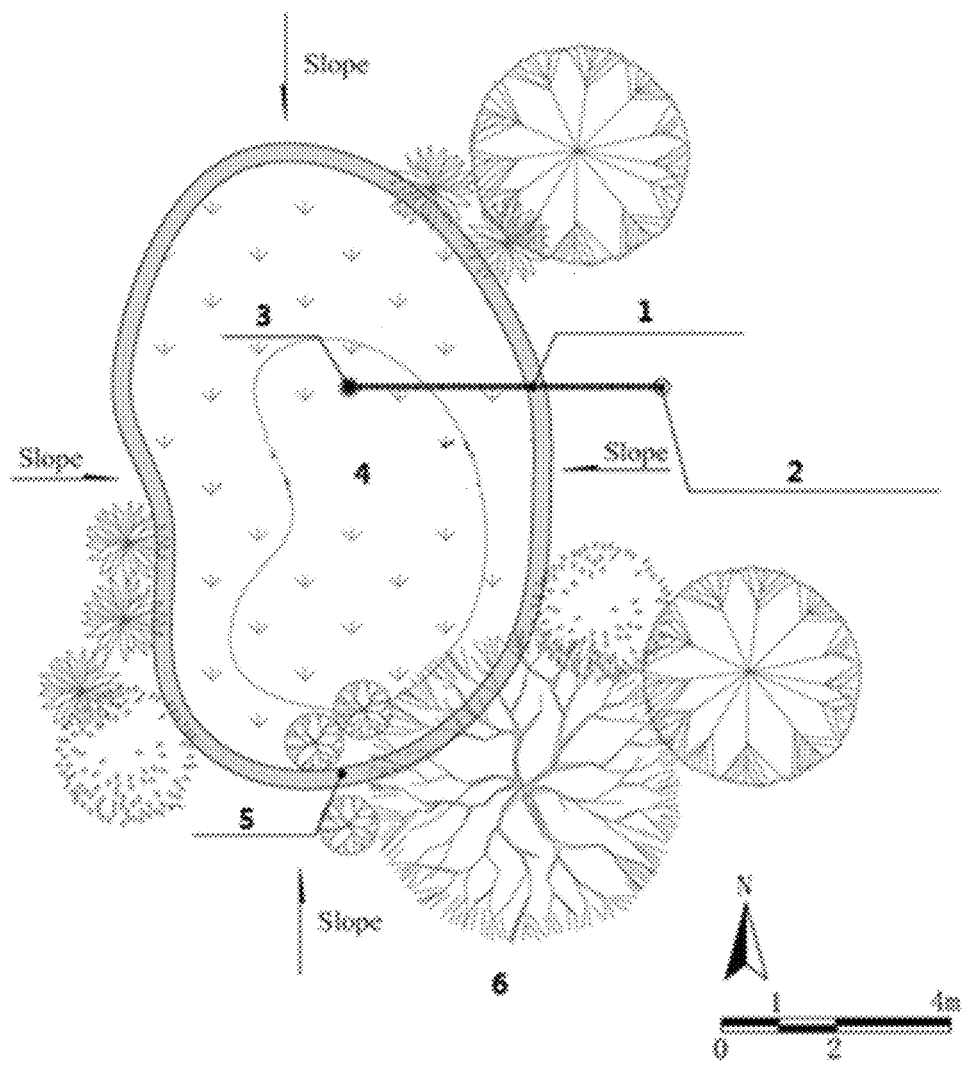
FIG. 5 is a plan view of a storage-oriented salt-isolated rain garden applied in a park green space according to an example of the present invention. Reference Numerals in FIG. 5 are as follows: 1. Underground stormwater pipe; 2. Access to municipal stormwater pipeline; 3. Overflow port; 4. Storage-oriented salt-isolated rain garden; 5. Slope gravel; 6. Park green space.

The storage-oriented salt-isolated rain garden applies to various park green spaces in moderate or mild saline areas. The plan of the new urban area of Nanhui New City includes parks with different themes and types, such as Dishui Lake Park and Shanghai Haichang Ocean Park. As a recreational venue, the park must feature aesthetics and environmental functions. The sponge city technology can be introduced to unearth the profound science, education and culture value of the park, making the park a special education practice base or an ecological tourist attraction. The plan view of the storage-oriented salt-isolated rain garden in the park green space is shown in FIG. 5.

In this example, the purification-oriented salt-isolated rain garden can handle the runoff collected from a larger confluence area with a smaller design area, and has a high treatment capacity for heavily polluted runoff. It applies to areas with a certain distance from the seaside, serious runoff pollution and mild salinization (salt content 0.1%-0.6%). This type of rain garden applies to squares, roads, parking lots and other sites with serious pollution on the northern bank section of Luchao Port, the southern bank section of Chongming Island, Changxing Island, Hengsha Island, Tuanjiesha and the Nanhui New City.

The purification-oriented salt-isolated rain garden is also composed of 7 structural layers, which are drainage layer, salt barrier, filler layer, transition layer, planting soil layer and ponding layer in sequence from bottom to top. The vertical sequence is the same as that of the storage-oriented salt-isolated rain garden structure, but there are differences in specific materials and thickness, as shown in Table 38. In order to protect the normal function of the rain garden, it is recommended that in the actual operation, the high-concentration sewage accumulated 10-15 min before the rain is directly discharged into the urban sewage pipe. The disposition of the ponding layer, the planting soil layer, the mulch layer and the transition layer are basically the same as the storage-oriented salt-isolated rain garden. The filler layer is made of planting soil, which is preferably 0.30 m in thickness. The lower part of the filler layer is a salt barrier with a thickness of 0.30 m. It is recommended to lay river sand with a particle size of 0.25-0.35 mm to block the upward movement of salt under the premise of ensuring infiltration. The river sand also has a good pollutant removal effect. The drainage layer under the salt barrier is 0.10 m in thickness and filled with gravel with a diameter of 10-20 mm. The structure of the water seepage and overflow facilities of this type of rain garden is the same as the strong-salt-isolated rain garden above.

TABLE 38

Structure of purification-oriented salt-isolated rain garden

| Design specifications | | Material | Design parameters | Thickness (m) |
|---|---|---|---|---|
| Structural layers | Ponding layer | — | | 0.15-0.20 |
| | Mulch layer | Bark or gravel | | 0.02-0.05 |
| | Planting soil layer | Planting soil | | 0.20-0.30 |

TABLE 38-continued

Structure of purification-oriented salt-isolated rain garden

| Design specifications | | Material | Design parameters | Thickness (m) |
|---|---|---|---|---|
| | Transition layer | Permeable geotextile or medium sand | | 0.05 |
| | Filler layer | Planting soil | | 0.30 |
| | Salt barrier | River sand with particle size of 0.25-0.35 mm | | 0.10 |
| | Drainage layer | Gravel with particle size of 10-20 mm | | 0.10 |
| Other main indicators | Design area | | 60 ± 10 m² | |
| | Total depth | | 0.90-1.05 m | |
| | Gradient of side slope i. | | ⅕-¼ | |

The purification-oriented salt-isolated rain garden mainly applies to squares, roads, parking lots and other sites with serious runoff pollution and large hard area in mild saline areas. Plants mainly stabilize the soil and purify the water through biological interception and root adsorption. The plant selection process should focus on the decontamination ability, tolerance ability, landscape effect and management difficulty of plants. The purification-oriented salt-isolated rain garden constructed in roads and parking lots should plant perennial herbs that can enhance the landscape effect, facilitate management and maintenance and have strong decontamination/stain resistance ability.

The purification-oriented salt-isolated rain garden mainly applies to green spaces of roads, squares and parking lots, which usually require shades of evergreen trees. The rain garden can be combined with the original trees to form a rich mix of trees, shrubs and grasses. In addition, to combine with evergreen trees, it is necessary to consider the light, so low impact development (LID)-adaptive shade-tolerant plants are usually planted.

This example was experimented in Shanghai. The northern bank sections of Luchao Port and Nanhui New City have high level of urbanization and rich water bodies. The Luchaogang community and some downtown areas are built-up areas with a large hard area. Some rivers in the old urban areas are black and smelly. Therefore, it is recommended to use the purification-oriented salt-isolated rain garden. The purification-oriented salt-isolated rain garden can handle runoff from a large confluence area, and has a good treatment effect on the main pollutants such as COD, TN, TP in the sewage. The purification-oriented salt-isolated rain garden is suitable for parking lots, traffic squares, roads and other places with high hardening degree and serious pollution. As the layout of the parking lots is similar to that of road green spaces, this section shows only the construction effects at the green spaces of parking lots and squares.

Figure 6:
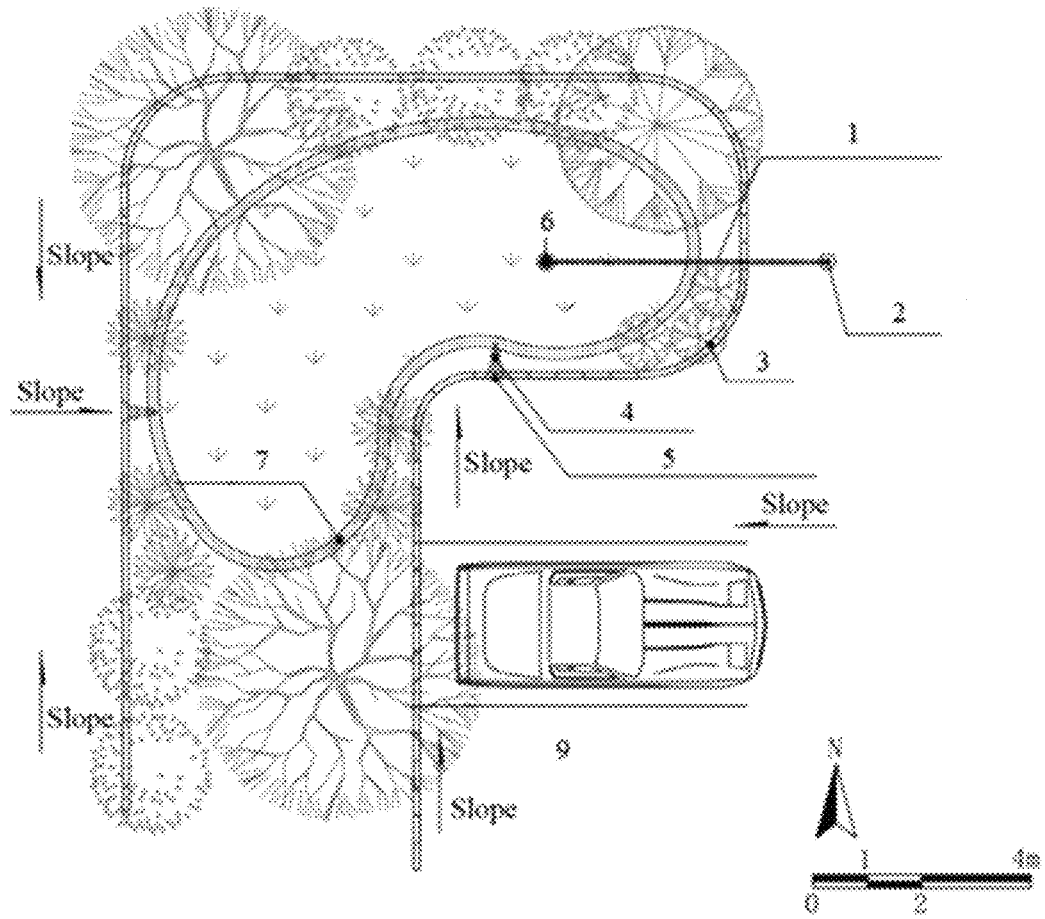
FIG. 6 is a plan view of a purification-oriented salt-isolated rain garden applied to a parking green space according to an example of the present invention. Reference Numerals in FIG. 6 are as follows: 1. Underground stormwater pipe; 2. Stormwater well; 3. Curb; 4. PVC water inlet pipe; 5. Curb opening (water inlet); 6. Overflow port; 7. Slope gravel; 8. Parking lot.

The purification-oriented salt-isolated rain garden can be constructed in green spaces and planting ponds around the parking lots. Since the green area of these sites is usually small, the purification-oriented salt-isolated rain garden can be combined with a permeable pavement to reduce the surface runoff and improve the decontamination efficiency of the rain garden. The purification-oriented salt-isolated rain garden can also be combined with the original greening to use the ecological functions of the plants to reduce car exhaust pollution, reduce the noise impact of vehicles, and create a better microclimate environment for the parking lots. The sectional view and application structure of the purification-oriented salt-isolated rain garden are shown in FIG. 6.

The purification-oriented salt-isolated rain garden can also be constructed in small green spaces such as landscape greenbelts, flower beds, and planting ponds in square green spaces. The rain garden is located based on the drainage slope and direction of the current square, and a site with large confluence is selected. The shape of the rain garden is designed in accordance with the existing shape of the green space. Diversion pipes and other devices can be used to assist drainage, so as to achieve local retention of stormwater runoff and reduce the daily water consumption of landscape green spaces.

In this example, the comprehensive type salt-isolated rain garden applies to areas with mild salinization (salt content 0.1%-0.6%). This type of rain garden applies to the northern bank section of Luchao Port, the southern bank section of Chongming Island, Changxing Island, Hengsha Island, Tuanjiesha and the Nanhui New City. The comprehensive type salt-isolated rain garden is suitable for moderate to mild saline areas with large stormwater runoff and serious surface runoff pollution. In practical applications, it can be laid out in small green spaces of streets and residential areas with large burden in stormwater management and water purification.

Like the purification-oriented salt-isolated rain garden, the comprehensive type salt-isolated rain garden is also composed of 7 structural layers. The vertical sequence of the structural layers is the same as that of the purification-oriented salt-isolated rain garden structure, but there are differences in specific materials and thickness, as shown in Table 39. This type of rain garden is widely used. If the construction area is sufficient, the slope protection structure can be arranged on the periphery of the rain garden with pebbles and other materials. In addition, the high-concentration sewage accumulated 10-15 min before the rain can be directly discharged into the urban sewage pipe to reduce the impact of heavy rain and high-concentration pollutants on the plants and structural layers of the comprehensive type salt-isolated rain garden. The disposition of the ponding layer, the planting soil layer, the mulch layer and the transition layer of are basically the same as the purification-oriented salt-isolated rain garden. The filler layer is made of planting soil, which is preferably 0.30 m in thickness. The lower part of the filler layer is a salt barrier with a thickness of 0.10 m. It is recommended to lay zeolite with a particle size of 2-4 mm to block the upward movement of salt under the premise of ensuring infiltration. The drainage layer under the salt barrier is 0.10 m in thickness and filled with gravel with a diameter of 10-20 mm. The structure of the water seepage and overflow facilities of this type of rain garden is the same as the strong-salt-isolated rain garden above.

TABLE 39

Structure of comprehensize type salt-isolated rain garden

| Design specifications | | Material | Design parameters | Thickness (m) |
|---|---|---|---|---|
| Structural layers | Ponding layer | — | | 0.15-0.20 |
| | Mulch layer | Bark or gravel | | 0.02-0.05 |
| | Planting soil layer | Planting soil | | 0.20-0.30 |
| | Transition layer | Permeable geotextile or medium sand | | 0.05 |

TABLE 39-continued

Structure of comprehensize type salt-isolated rain garden

| Design specifications | | Material | Design parameters | Thickness (m) |
|---|---|---|---|---|
| | Filler layer | Planting soil | | 0.30 |
| | Salt barrier | Zeolite with particle size of 2-4 mm | | 0.10 |
| | Drainage layer | Gravel with particle size of 10-20 mm | | 0.10 |
| Other main indicators | Design area | | 60 ± 10 m² | |
| | Total depth | | 0.90-1.05 m | |
| | Gradient of side slope i. | | 1/5-1/4 | |

The comprehensive type salt-isolated rain garden is the most widely used in practical applications. The rain garden's plant configuration should consider the tolerance of the plants. It should enrich the plant species with many herbs and shrubs to help build different landscape effects and promote the comprehensive type salt-isolated rain garden.

The comprehensive type salt-isolated rain garden is usually constructed in green spaces of residential areas, so the plant selection also needs to consider the cost of later property maintenance and residents' acceptance. Plants with special smells, thorns or poisons should be avoided to ensure the greening safety of residential areas. Low perennial ground cover plants such as stonecrop and hylotelephium erythrostictum are preferred to be planted to cover the bare planting layer, so as to reduce the generation of weeds and reduce the cost of manual weeding.

The pilot area is under great pressure for SCC. There are many residential areas in the old town of Luchao Port and in the downtown of some new areas. In the old town, there is a large amount of direct stormwater discharge from the roof of the buildings and also initial stormwater source pollution. The old residential areas in the old town basically adopt above-ground parking, and there is no underground garage as a partition, so the greening land is also facing the problem of resalinization. Therefore, it is recommended to build a comprehensive type salt-isolated rain garden in the green space between the houses.

Figure 7:
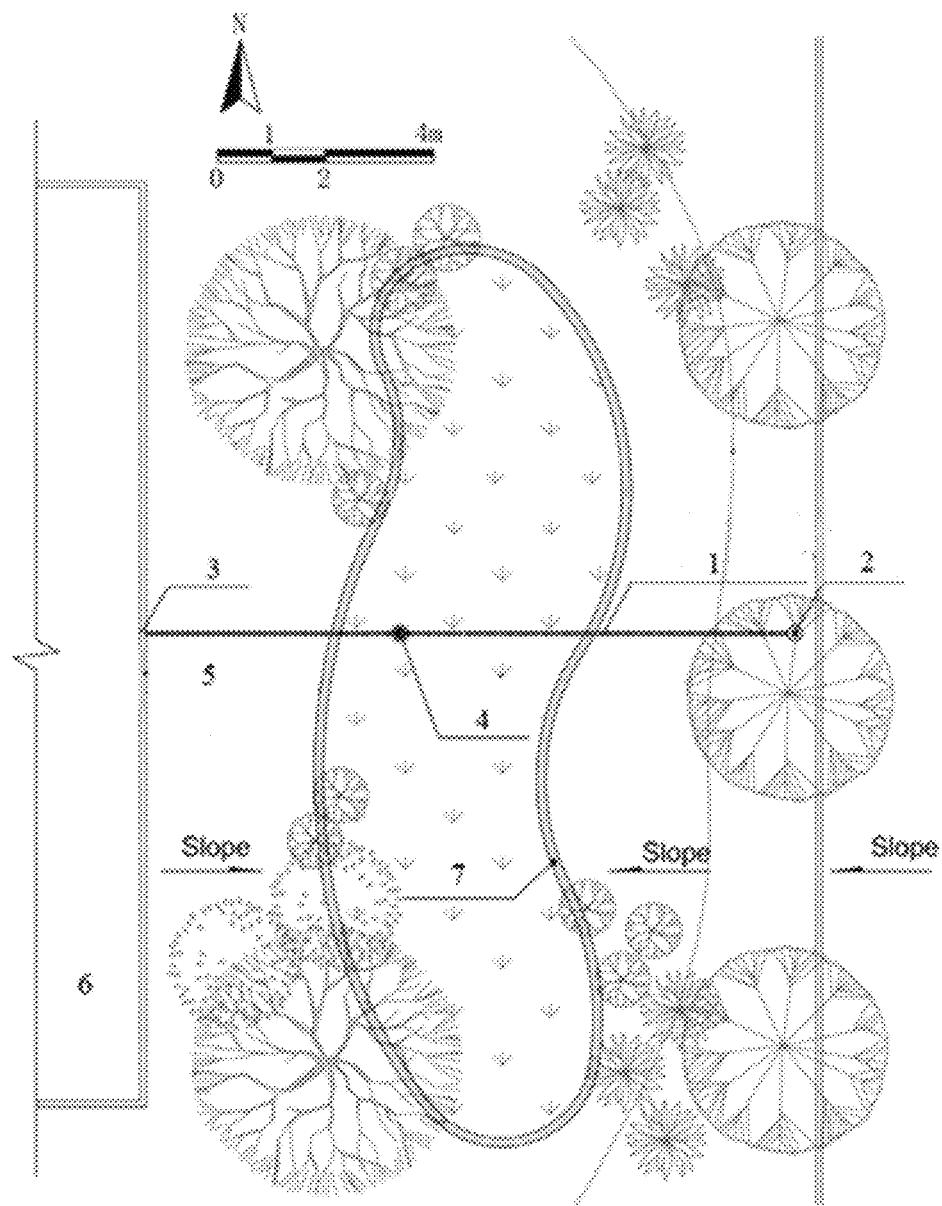
FIG. 7 is a plan view of a comprehensive type salt-isolated rain garden applied in a residential green space according to an example of the present invention. Reference Numerals in FIG. 7 are as follows: 1. Underground stormwater pipe; 2. Stormwater well; 3. Downpipe; 4. Overflow port; 5. Green space between houses; 6. Building; 7. Slope gravel.

Stormwater runoff in residential areas mainly comes from hardened roads and squares, roof drainage and green space confluence. The runoff from hardened roads and squares usually has a high pollutant load, while the stormwater runoff from roofs and surrounding green spaces is large. Therefore, it is necessary to set up a comprehensive type salt-isolated rain garden with balanced hydrological storage and water purification functions at the intersection of the three types of runoff. The construction of the rain garden can improve the stormwater utilization of the green space in the residential area, solve some internal water supply problems, reduce the water consumption of the green landscape, and reduce the maintenance cost of the property in the later period. The sectional view of the comprehensive type salt-isolated rain garden in the green space of residential areas is shown in FIG. 3 and the plan view thereof is shown in FIG. 7.

When the comprehensive type salt-isolated rain garden applies to the green space in the residential areas, the following issues should also be noted:

(1) The location of the comprehensive type salt-isolated rain garden in the residential area needs to take into account the location and drainage direction of the road/square, the roof of the building and the greening land. It is better to lay out the comprehensive type salt-isolated rain garden in the green space between the road and the building, making it more than 3 m away from the building foundation to prevent the foundation from being flooded when the rain garden accumulates water [62].

(2) The comprehensive type salt-isolated rain garden should be designed to connect the building downpipe and roadside infrastructure, and lead the runoff from the building roof and road to the rain garden as much as possible. In addition, the gravel and other materials should be used as buffers at the water outlet of the building downpipe to prevent the erosion and damage of the rain garden surface caused by large flow of roof water.

(3) The rain garden can be coordinated with other low-impact facilities in the residential area, such as the roof green space of the building, the permeable pavement of the road and square, the grass ditch and the reservoir.

(4) The rain garden constructed in the green space of residential areas must be safe. There should be eye-catching signage and lighting in the easy reach of the elderly and children, and ecological protection barriers such as hedges should also be set up to prevent residents from falling into the ground.

The above are only examples of the present invention, and common knowledge such as specific structures and characteristics known in the art is not described here too much. It should be noted that those skilled in the art may further make several variations and improvements without departing from the scope of the present invention, but such variations and improvements should also be deemed as falling within the protection scope of the present invention without affecting the implementation effect and practicability of the patent.

What is claimed is:

1. A salt-isolated rain garden structure, comprising a depression surrounded by side slopes, wherein a 10 cm thick drainage layer, a 10-30 cm thick filler layer, a 5 cm thick transition layer, a 20-30 cm thick planting layer, a 0.2-0.5 cm thick mulch layer and a 15-20 cm thick ponding layer are stacked in order from bottom to top of the depression; a salt barrier is disposed between the planting layer and the transition layer; a vertical overflow pipe and a horizontal drainage pipe are disposed at the bottom of the depression; the overflow pipe and the drainage pipe are connected; the salt barrier is filled with river sand, zeolite or ceramsite and is 10-20 cm in thickness.

2. The salt-isolated rain garden structure according to claim 1, wherein the particle size of the river sand is 0.25-0.35 mm; the particle size of the zeolite is 2-4 mm; or the particle size of the ceramsite is 10-25 mm.

3. The salt-isolated rain garden structure according to claim 1, wherein the drainage layer is filled with gravel with a diameter of 10-20 mm.

4. The salt-isolated rain garden structure according to claim 1, wherein the transition layer is filled with medium sand with a particle size of 0.35-0.50 mm.

5. The salt-isolated rain garden structure according to claim 1, wherein the filler layer is planting soil comprising a mixture of 30% of common greening topsoil, 50% of sandy soil and 20% of peat soil (by volume).

6. The salt-isolated rain garden structure according to claim 1, wherein the mulch layer is bark or gravel, and the transition layer is a permeable geotextile or medium sand.

* * * * *

UNITED STATES PATENT AND TRADEMARK OFFICE
CERTIFICATE OF CORRECTION

| | | |
|---|---|---|
| PATENT NO. | : 11,470,787 B2 | |
| APPLICATION NO. | : 16/889022 | |
| DATED | : October 18, 2022 | |
| INVENTOR(S) | : Bingqin Yu et al. | |

It is certified that error appears in the above-identified patent and that said Letters Patent is hereby corrected as shown below:

On the Title Page

Item (73) Assignees:
The first Assignee should correctly read Shanghai Municipal Engineering Design Institute (Group) Co., Ltd.

Signed and Sealed this
Thirteenth Day of December, 2022

Katherine Kelly Vidal
*Director of the United States Patent and Trademark Office*